(12) United States Patent
Kobayashi

(10) Patent No.: US 8,154,967 B2
(45) Date of Patent: Apr. 10, 2012

(54) OPTICAL RECORDING MEDIUM, RECORDING/REPRODUCTION APPARATUS, RECORDING METHOD, AND RECORDING/REPRODUCTION METHOD WITH ADJUSTMENT DATA FOR MULTIPLE LAYERS

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 11/522,459

(22) Filed: Sep. 18, 2006

(65) Prior Publication Data

US 2007/0070843 A1    Mar. 29, 2007

(30) Foreign Application Priority Data

Sep. 28, 2005 (JP) .................................. 2005-281438

(51) Int. Cl.
G11B 7/00 (2006.01)
(52) U.S. Cl. .................................................... 369/53.41
(58) Field of Classification Search .................... None
See application file for complete search history.

(56) References Cited

U.S. PATENT DOCUMENTS

| | | | | |
|---|---|---|---|---|
| 5,233,576 A * | 8/1993 | Curtis et al. | ............... | 369/13.02 |
| 5,568,461 A | 10/1996 | Nishiuchi et al. | | |
| 6,240,055 B1 | 5/2001 | Takamine et al. | | |
| 7,184,377 B2 * | 2/2007 | Ito et al. | ...................... | 369/47.14 |
| 7,203,153 B2 * | 4/2007 | Kuraoka et al. | ............ | 369/275.3 |
| 7,729,218 B2 * | 6/2010 | Tokiwa et al. | ............. | 369/47.53 |
| 2004/0076096 A1 * | 4/2004 | Hwang et al. | .............. | 369/53.21 |
| 2004/0193946 A1 * | 9/2004 | Park et al. | .......................... | 714/6 |
| 2006/0062098 A1 | 3/2006 | Miyake et al. | | |
| 2006/0114793 A1 * | 6/2006 | Tonami | .................... | 369/112.01 |
| 2007/0201335 A1 * | 8/2007 | Yoshida et al. | ............ | 369/53.31 |
| 2008/0037378 A1 * | 2/2008 | Tasaka et al. | ............. | 369/44.11 |

FOREIGN PATENT DOCUMENTS

| | | |
|---|---|---|
| EP | 1 136 988 A2 | 9/2001 |
| EP | 1 205 923 A2 | 5/2002 |
| EP | 1 341 163 A2 | 9/2003 |
| EP | 1 542 212 A2 | 6/2005 |
| EP | 1 575 039 A1 | 9/2005 |
| JP | 5-266594 | 10/1993 |
| JP | 9-6426 | 1/1997 |
| JP | 2000-155961 | 6/2000 |
| JP | 2001-351334 | 12/2001 |
| JP | 2002-150569 | 5/2002 |
| JP | 2004-178661 | 6/2004 |
| WO | WO 2004/001731 A1 | 12/2003 |
| WO | WO 2005064599 A1 * | 7/2005 |

* cited by examiner

*Primary Examiner* — Hoa T Nguyen
*Assistant Examiner* — Mark Fischer
(74) *Attorney, Agent, or Firm* — Oblon, Spivak, McClelland, Maier & Neustadt, L.L.P.

(57) ABSTRACT

An optical recording medium provided with one or a plurality of recording layers includes an adjustment data recording area for recording therein adjustment data used for adjusting focus or spherical aberration of laser light used for recording/reproduction, the adjustment data recording area being disposed at a predetermined position on each of the one or plurality of recording layers, and a determination information recording area for recording therein determination information indicating whether or not the adjustment data has been recorded in the adjustment data recording area in each of the one or plurality of recording layers.

3 Claims, 25 Drawing Sheets

EVEN-NUMBERED LAYER
( L1, L3 ····· )

ODD-NUMBERED LAYER
( L0, L2 ····· )

FIG. 10

DMA

| CLUSTER NUMBER | CONTENT | NUMBER OF CLUSTERS |
|---|---|---|
| 1-4 | DDS (RECORDED FOUR TIMES) | 4 |
| 5-8 | DFL#1 | 4 |
| 9-12 | DFL#2 (SAME CONTENT AS #1) | 4 |
| 13-16 | DFL#3 (SAME CONTENT AS #1) | 4 |
| 17-20 | DFL#4 (SAME CONTENT AS #1) | 4 |
| 21-24 | DFL#5 (SAME CONTENT AS #1) | 4 |
| 25-28 | DFL#6 (SAME CONTENT AS #1) | 4 |
| 29-32 | DFL#7 (SAME CONTENT AS #1) | 4 |

32 CLUSTERS

FIG. 12

| BIT 0 | BIT 1 | BIT 2 | BIT 3 | BIT 4 | BIT 5 | BIT 6 | BIT 7 |
|---|---|---|---|---|---|---|---|
| L0 | L1 | L2 | L3 | L4 | L5 | L6 | L7 |

FIG. 13

| CLUSTER NUMBER/ DATA FRAME NUMBER | BYTE POSITION IN DATA FRAME | CONTENT | NUMBER OF BYTES |
|---|---|---|---|
| 0 / 0 | 0 | DEFECT LIST HEADER | 64 |
| 0 / 0 | 64 | LIST OF DEFECTS (DFL ENTRY) | N × 8 |
| ... | ... | ... | |
| m / n | k | DEFECT LIST TERMINATOR | 8 |
| 3 / 31 | k + 8 | RESERVE (00H) | .. |

N: NUMBER OF ENTRIES

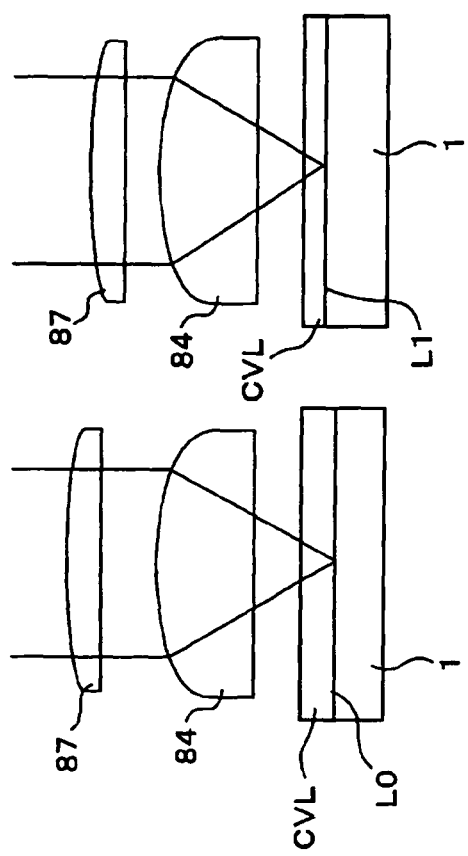
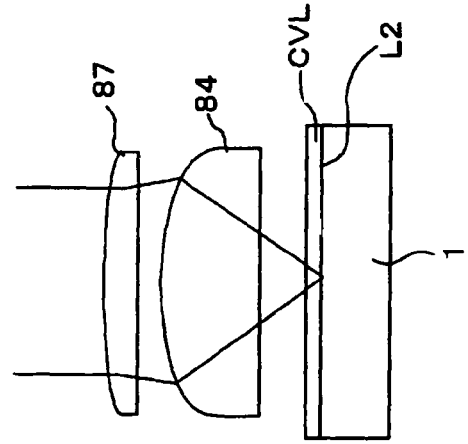
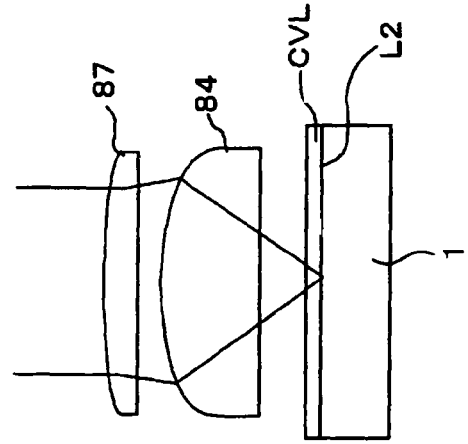
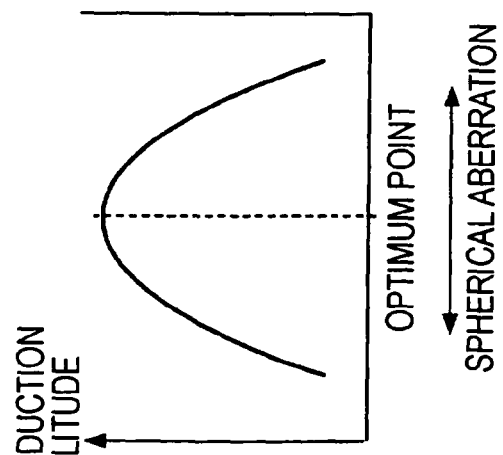

OPTICAL RECORDING MEDIUM, RECORDING/REPRODUCTION APPARATUS, RECORDING METHOD, AND RECORDING/REPRODUCTION METHOD WITH ADJUSTMENT DATA FOR MULTIPLE LAYERS

CROSS REFERENCES TO RELATED APPLICATIONS

The present invention contains subject matter related to Japanese Patent Application JP 2005-281438 filed in the Japanese Patent Office on Sep. 28, 2005, the entire contents of which are incorporated herein by reference.

BACKGROUND OF THE INVENTION

1. Field of the Invention

The present invention relates to an optical recording medium such as an optical disc, a recording apparatus for the optical recording medium, a recording/reproduction apparatus, a recording method, and a recording/reproduction method.

2. Description of the Related Art

Data recording/reproduction techniques are known which use optical discs as recording media, such as CDs (Compact Discs) and DVDs (Digital Versatile Discs), for recording/reproducing digital data. The term "optical discs" refers in general to recording media formed of a thin circular metal plate protected with plastic, onto which laser light is irradiated so that a data signal can be read by detecting variations in the intensity of reflected light.

Optical discs include, for example, reproduction-only type-optical discs, such as CDs, CD-ROMs and DVD-ROMs, and recordable-type optical discs, such as MDs (Mini-Discs), CD-Rs, CD-RWs, DVD-R, DVD-RWs, DVD+RWs, and DVD-RAMs in which user data can be recorded. Data can be recorded on such recordable-type optical discs by employing recording techniques such as magneto-optical recording, phase-change recording, and dye-film change recording. Dye-film change recording is also called write-once recording and is preferable for a data storage application, since it permits recording of data only one time and does not permit rewriting of recorded data. In magneto-optical recording and phase-change recording, on the other hand, rewriting of data is permitted. Thus, these recording techniques are used for various applications such as recording of content data of music, movies, games, application programs, etc.

In recent years, a high-density optical disc called Blue-ray Disc has been developed with a view to realizing a significant increase in capacity.

In such a high-density optical disc, for example, when recording/reproduction is performed using a laser with a wavelength of 405 nm (i.e., a blue laser) and an objective lens with an NA of 0.85, approximately 23.3 GB (gigabyte) of data can be recorded on or reproduced from a disc having a diameter of 12 cm. In this example, this large capacity is achieved when the disc has a track pitch of 0.32 μm, a linear density of 0.12 μm/bit, and a format efficiency of 82% with a recording/reproduction unit of a 64 KB (kilobyte) data block.

Further, if the linear density of the above optical disc is 0.112 μm/bit, a 25 GB capacity can be achieved.

Moreover, by adding a further recording layer so that the optical disc has two recording layers, the capacity can be doubled to 46.6 GB or 50 GB.

Needless to say, by increasing the number of the recording layer to three, four, . . . N; a capacity of 23.3 GB or 25 GB times three, four, . . . N can be realized.

The write-once type and the writable type of such high-density optical discs have also been developed.

SUMMARY OF THE INVENTION

However, high-density optical discs, due to the decrease in laser wavelength and decrease in NA, have lower tolerances for defocus and spherical aberration in recording/reproduction than those of CDs and DVDs. Thus, fine adjustment of focus and spherical aberration is necessary in recording/reproduction using such a high-density optical disc. Particularly, when the disc is provided with a plurality of recording layers (i.e., a multilayer disc), precise adjustment has to be performed for each recording layer. In this case, it is desirable that the adjustment can be performed in a short time taking accessibility into consideration.

In addition, in adjustment of focus or spherical aberration, while data is being reproduced the quality of the reproduced data is monitored so that the focus or spherical aberration is appropriately adjusted. Thus, it is necessary that the data be recorded in advance. However, when adjustment of focus or spherical aberration for a write-once disc or a phase-change disc is desired, data is not necessarily recorded on the disc before the adjustment is performed.

Thus, the adjustment of focus and spherical aberration is normally carried out on a write-once disc or a phase-change disc when recording conditions such as a laser power are adjusted. Specifically, a recording apparatus conducts test writing in a predetermined area for laser power adjustment before performing a recording operation, and then reproduces the written data so as to adjust the laser power. At the same time, the recording apparatus also performs adjustment of focus and spherical aberration using the written data.

However, an adjustment operation of focus and spherical aberration performed during an adjustment operation of recording conditions such as laser power results in an increase in the complexity of processing. In addition, adjustment values applied in both the adjustment operations affect each other, causing the necessity of a long time for processing.

The present invention has been made in view of the above circumstance. Accordingly, there is a need for a technique for adjusting focus and spherical aberration in a short time.

Thus, according to an aspect of the present invention, an optical recording medium provided with one or a plurality of recording layers includes an adjustment data recording area for recording therein adjustment data used for adjusting focus or spherical aberration of laser light used for recording/reproduction, the adjustment data recording area being disposed at a predetermined position on each of the one or a plurality of recording layers, and a determination information recording area for recording therein determination information indicating whether or not the adjustment data has been recorded in the adjustment data recording area in each of the one or a plurality of recording layers.

The determination information to be recorded in the determination information recording area includes one bit for each recording layer so that a value of the one bit indicates whether or not the adjustment data has been recorded.

The optical recording medium is a write-once recording medium on which data can only be written one time.

According to an aspect of the present invention, a recording apparatus for recording data the an optical recording medium includes recording means for performing data recording on the optical recording medium and controlling means for controlling the recording means so that the adjustment data is recorded in the adjustment data recording area.

When the recording means is controlled so that the adjustment data is recorded in the adjustment data recording area, the controlling means controls the recording means so that the determination information is recorded in the determination information recording area, in response to the recording of the adjustment data.

The controlling means determines a recording status of the adjustment data recording area in each recording layer on the basis of the determination information in the determination information recording area, and, on the basis of a result of the determination, controls the recording means so that the adjustment data is recorded in all or at least one of the adjustment data recording areas in each recording layer.

According to an aspect of the present invention, a recording/reproduction apparatus for recording data on or reproducing data from the optical recording medium includes recording/reproducing means for performing data recording or data reproduction using the optical recording medium, adjusting means for adjusting focus or spherical aberration of laser light output from the recording/reproducing means, and controlling means for causing the adjusting means to adjust the focus or spherical aberration while causing the recording/reproducing means to reproduce the adjustment data recorded in the adjustment data recording area.

When it is determined that the adjustment data has been recorded in the adjustment data recording area on the basis of the determination information recorded in the determination information recording area, the controlling means causes the recording/reproduction means to reproduce the adjustment data recorded in the adjustment data recording area and causes the adjusting means to adjust the focus or spherical aberration.

According to an aspect of the present invention, a recording method for recording data on the optical recording medium includes the steps of recording the adjustment data in the adjustment data recording area and recording the determination information in the determination information recording area in response to the recording of the adjustment data.

According to an aspect of the present invention, a recording/reproduction method for recording data on or reproducing data from the optical recording medium includes the steps of determining whether or not the adjustment data has been recorded in the adjustment data recording area, on the basis of the determination information in the determination information recording area, and, when it is determined in the determining step that the adjustment data has been recorded, adjusting the focus or spherical aberration while reproducing the adjustment data recorded in the adjustment data recording area.

According to an aspect of the present invention, a recording apparatus for performing data recording on the optical recording medium includes recording means for recording adjustment data used for adjusting focus or spherical aberration of laser light used for recording/reproduction in an adjustment data recording area disposed at a predetermined position on each of the one or a plurality of recording layers, and recording determination information indicating whether or not the adjustment data has been recorded in the adjustment data recording area provided in each of the one or a plurality of recording layers, in a determination information recording area disposed at a predetermined position on each of the one or a plurality of recording layers.

According to an aspect of the present invention, a recording method in which data recording is performed on the optical recording medium includes the steps of recording adjustment data used for adjusting focus or spherical aberration of laser light used for recording/reproduction in an adjustment data recording area disposed at a predetermined position on each of the one or a plurality of recording layers, and recording determination information indicating whether or not the adjustment data has been recorded in the adjustment data recording area provided in each of the one or a plurality of recording layers, in a determination information recording area disposed at a predetermined position on each of the one or a plurality of recording layers.

In an optical recording medium having one or a plurality of recording layers, the adjustment data recording area is provided on each recording layer, and the determination information area is provided at a predetermined area such as a management information area. This allows a recording apparatus and a reproduction apparatus to immediately recognize whether or not the adjustment data has been recorded in the adjustment data recording area on the basis of the determination information recorded in the determination information recording area. For example, these apparatuses can determine a recording status of the adjustment data recording area without performing a search operation for determining whether or not adjustment data can be obtained during reproduction. In the search operation, it is determined, for each recording layer, whether or not the adjustment data has been recorded in the adjustment data recording area.

Further, if the adjustment data has been recorded in the adjustment data recording area, a recording apparatus and a reproduction apparatus, before executing recording or reproduction, are allowed to immediately perform adjustment of focus and spherical aberration while reproducing the adjustment data recording area. For a recording medium having a plurality of recording layers, adjustment of focus and spherical aberration can be performed using each adjustment data recording area provided in the individual recording layers. This permits fine adjustment of focus and spherical aberration for each layer.

According to an embodiment of the present invention, an adjustment data recording area used for adjusting focus and spherical aberration is provided on one or a plurality of recording layers of an optical recording medium. A recording apparatus records adjustment data in the adjustment data recording area. The recording apparatus further records determination information in a determination information recording area in response to the recording of the adjustment data.

In a recording operation or a reproduction operation, the recording apparatus or a reproduction apparatus checks the determination information in the determination information recording area of the optical recording medium, so as to immediately recognize whether or not the adjustment data has been recorded in the adjustment data recording area on each recording layer. If the adjustment data has been recorded on the adjustment data recording area, adjustment of focus or spherical aberration can be executed while the adjustment data recording area is being reproduced. Particularly, using the recording area, which is dedicated for adjustment of focus and spherical aberration, the adjustment of focus or spherical aberration can be performed independently of adjustment of recording conditions such as a laser power. This reduces the time necessary for the adjustment operations.

With this technique, focus and spherical aberration can be adjusted in a short time in a recording or reproduction operation. That is, adjustment operations performed as a preparation for recording/reproduction can be completed in a short time, and thus a recording/reproduction apparatus with high operating efficiency can be realized. In addition, recording and reproduction operations with appropriate focus and spherical aberration can be realized.

In addition, for an optical recording medium having a plurality of recording layers, recording and reproduction operations with focus and spherical aberration which are appropriate for each recording layer can be achieved.

BRIEF DESCRIPTION OF THE DRAWINGS

FIG. 10 illustrates a DMA of a disc according to an embodiment of the present invention;

FIG. 12 illustrates a pre-write area flag of a disc according to an embodiment of the present invention;

FIG. 13 illustrates a DFL of a disc according to an embodiment of the present invention;

FIGS. 21A to 21D illustrate spherical aberration adjustment according to an embodiment of the present invention;

DESCRIPTION OF THE PREFERRED EMBODIMENTS

In the following, the preferred embodiments of the present invention will be described in the order outlined below. In these exemplary embodiments, a high-density optical disc is applied as an example of an optical recording medium according to an embodiment of the present invention. As an example of a recording/reproduction apparatus according to an embodiment of the present invention, a disc drive apparatus serving to record data on and reproduce data from the high-density optical disc is applied. A recording method and a recording/reproduction method according to an embodiment of the present invention are implemented in the disc drive apparatus.

1. Structures of One-Layer/Two-Layer/N-Layer Discs
2. Area Structure of Disc
3. DMA (Disc Management Area)
4. Configuration of Disc Drive Apparatus
5. Processing Performed When Disc is Mounted

[1. Structures of One-Layer/Two-Layer/N-Layer Discs]

An optical disc 1 described in this embodiment is assumed to be a write-once optical disc of the category of high-density optical discs called Blue-ray discs. In such a write-once optical disc, an organic dye material or an inorganic material such as an Si film and Cu-alloy film is used for a recording layer. However, other types of discs, for example, having recording layers formed of phase-change recording films and magneto-optical recording films, or rewritable discs can be employed in a structure of an embodiment of the present invention which will be described.

An example of physical parameters of the high-density optical disc 1 according to an embodiment of the present invention will be described.

The optical disc 1 has a diameter of 120 mm and a thickness of 1.2 mm. That is, the optical disc 1 in this embodiment has the same appearance as a CD (Compact Disc) or a DVD (Digital Versatile Disc).

A blue laser is used for recording on/reproduction from the optical disc 1. The optical disc 1 has a user data recording capacity of approximately 23 to 25 GB per recording layer, by employing a small track pitch (for example, 0.32 µm), a high recording linear density (for example, 0.12 µm), and an optical system having a high NA (for example, 0.85).

Types of the optical disc 1 according to an embodiment of the present invention include an optical disc having one recording layer (a one-layer disc), and an optical disc having two or more recording layers (a two-layer disc, a three-layer disc, etc.). Such a disc having two or more recording layers is generally called a "multilayer disc" or an "N-layer disc", in this embodiment. "N" indicates the number of recording layers. Needless to say, the recording capacity significantly increases with increasing number of recording layers.

Figure 1:
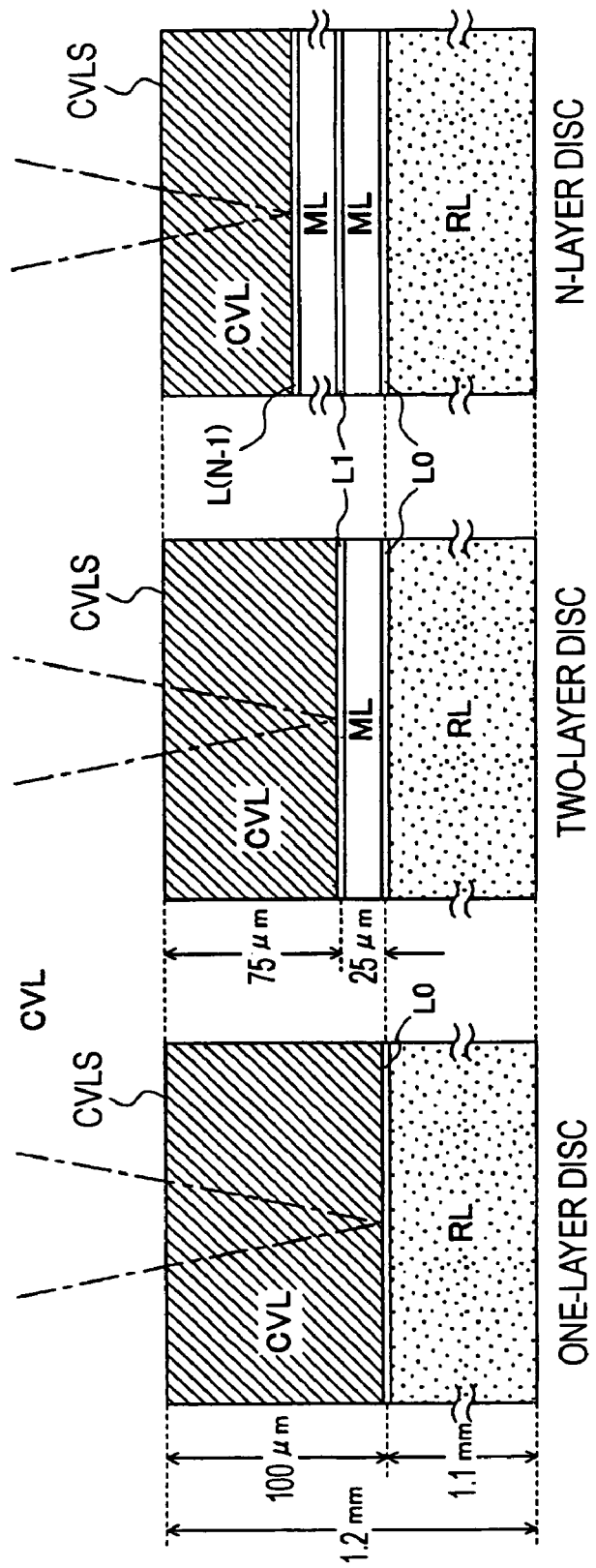
FIGS. 1A and 1B illustrate a layer structure of a disc according to an embodiment of the present invention.

Examples of a one-layer disc, a two-layer disc, and an N-layer disc are schematically illustrated in FIG. 1A. FIG. 1B illustrates a layer address assigned to each recording layer of the individual discs.

The thickness of each disc is 1.2 mm, as mentioned above, and the thickness of a substrate RL formed of polycarbonate is 1.1 mm.

An optical beam emitted from a disc drive apparatus for performing recording on and reproduction from the disc 1 is illustrated by a dotted-chain line. This optical beam is a blue laser beam having a wavelength of 405 nm and is converged through an objective lens with an NA of 0.85 onto the optical disc 1 from the side of a cover layer CVL.

The one-layer disc illustrated in FIG. 1A includes a substrate RL having a thickness of 1.1 mm, a recording layer L0 formed of a dye-change recording film, and a cover layer CVL having a thickness of 100 μm. The recording layer L0 is disposed on the substrate RL. The cover layer CVL is disposed on the recording layer L0.

In recording/reproduction of this one-layer disc, the optical beam is incident from the CVL side and converged onto the recording layer L0.

The address assigned to the recording layer L0 is "0".

The two-layer disc illustrated in FIG. 1A includes, a substrate RL of 1.1 mm thickness, a first recording layer L0, a middle layer ML having a thickness of 25 μm, a second recording layer L1, and a CVL having a thickness of 75 μm. The first recording layer L0 is disposed on the substrate RL. The middle layer ML is sandwiched between the first recording layer L0 and the second recording layer L1. The CVL is disposed on the second recording layer L1.

In recording on/reproduction from this two-layer disc, the optical beam is incident from the CVL side and converged onto the recording layer L0 and the recording layer L1.

The address assigned to the first recording layer L0 is "0" and the address assigned to the second recording layer L1 is "1". Recording/reproduction is performed in the order of the layer address "0" and the layer address "1".

The first recording layer L0 of the two-layer disc is disposed at a position 100 μm distanced from the surface of the cover layer CVL (CVLS), similarly to the one-layer disc.

The N-layer disc illustrated in FIG. 1A includes a substrate RL having a thickness of 1.1 mm, a first recording layer L0, a second recording layer L1, . . . , and an Nth recording layer L(N–1), middle layers each having a thickness of 25 μm, and a cover layer CVL. Each of the middle layers MLs is sandwiched by two recording layers, similarly to the cases of the two-layer disc. Specifically, the Nth recording layer L(N–1) is disposed on the (N–1)th recording layer having the middle layer ML therebetween.

The thickness of the cover layer CVL is expressed as 100–(n–1)×25 μm.

In recording on/reproduction from the N-layer disc, the optical beam is incident form the CVL side and converged on each of the recording layers L0, L1, . . . , and LN.

The layer address assigned to the first recording layer L0 is "0", the layer address assigned to the second recording layer L1 is "1", and the layer address assigned to the Nth recording layer L(N–1) is "N–1". Recording on/reproduction from the N-layer disc is performed in the order of the layer address "0", the layer address "1", . . . , and the layer address "N–1".

The first recording layer L0 of the N-layer disc is disposed at a position 100 μm distanced from the surface of the cover layer CVL (CVLS), similarly to the cases of the one-layer disc and the two-layer disc.

Thus, in every one of the one-layer disc to the N-layer disc, the distance from the first recording layer L0 and the surface of the cover layer CVLS is 100 μm. In each multilayer disc, the recording layers L1 to L (N–1) formed of first to Nth organic-dye recording films are arranged between the first recording layers L0 and the surface of the cover layer CVLS.

Therefore, in every one of the one-layer disc to the N-layer disc, the first recording layer L0 can be disposed on the polycarbonate substrate RL. This allows a part of a manufacturing process to be standardized for all of the discs. In addition, the first recording layers L0 of all the discs can have similar recording/reproduction characteristics.

In a multilayer disc, the second and the subsequent layers are arranged at positions closer to the surface of the cover layer CVLS than the position at which the first recording layer L0 is arranged. Therefore, the distances from the second to Nth recording layers to the surface of cover layer are sequentially decreased. That is, as the number N increases, the thickness of the cover layer decreases, and the tolerance of the tilt angle of the optical beam with respect to the optical disc 1 increases.

Thus, conditions for recording on/reproducing from the second to the Nth recording layers such as recording/reproduction characteristics can be relaxed compared with those for the first recording layer. This increases productivity of multilayer discs while decreasing the cost.

When data is recorded on or reproduced from each of the recording layers L0 to L(N–1) of a multilayer disc, an optical beam is converged on each of the recording layers. At this time, since the distances from the surface of the cover layer CVLS to the individual recording layers vary, spherical aberration is corrected for each recording layer so that the data is appropriately recorded or reproduced.

In every one of the one-layer disc to the N-layer disc, the distance from the surface of the cover layer CVLS to the first recording layer L0 is 100 μm. Thus, it can be configured such that the spherical aberration is adjusted in an optical head in accordance with the first recording layer L0, before or when the optical disc 1 is mounted in the disc drive apparatus. With this configuration, an optical beam can appropriately be converged on the first recording layer L0 having the layer address "0" so that recording/reproduction can be performed from the layer address "0", when any of the one-layer disc to the N-layer disc is mounted.

[2. Area Structure of Disc]

Now, an area structure of the disc 1 as a one-layer disc, a two-layer disc, and an N-layer disc will be described.

Figure 2:
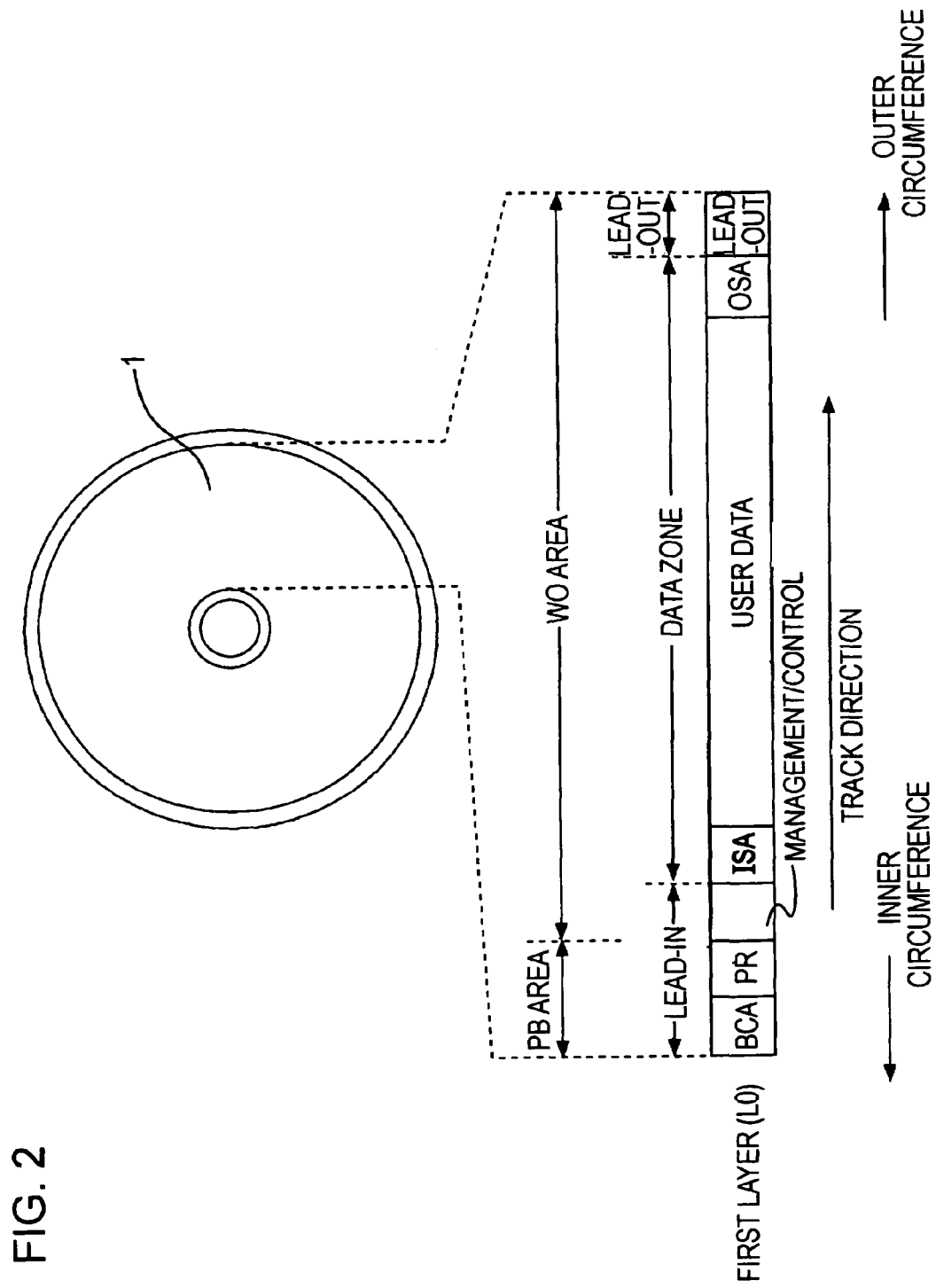
FIG. 2 illustrates an area structure of a one-layer disc according to an embodiment of the present invention.

FIG. 2 illustrates a layout (area structure) of the entire optical disc 1 as a one-layer disc.

Data areas of the disc 1 include a lead-in zone, a data zone, and a lead-out zone which are arranged in that order from the inner circumference side to the outer circumference side. In the lead-in zone, a BCA (Burst Cutting Area), a pre-recorded information area PR, and a management/control information area are provided in that order from the inner circumference side to the outer circumference side.

From the view point of a physical area structure concerning recording/reproduction, an area including the BCA arranged at the innermost circumference and the pre-recorded information area PR in the lead-in zone serves as a reproduction-dedicated area (a PB area). An area including the management/control information area in the lead-in zone to the lead-out zone serves as a write-once area (a WO area) in which data can only be recorded one time.

The BCA, provided at the innermost circumference in the lead-in zone serves to allow recording of data as a bar-code in a radial direction, using a recording technique in which the recording layer is burned with a high-output laser. Thus, an ID unique to each disc is recorded. Using this unique ID, copying of contents to the optical disc 1 is managed.

A recording track in the form of a wobbling groove (meandering groove) is spirally provided on the entire reproduction-dedicated area (PB area) except the BCA, i.e., the pre-recorded information area PR and WO area. The wobbling groove serves as a guide for a tracking operation of a laser spot. The wobbling groove also serves as the recording track used for data recording/reproduction.

In this embodiment, a case is described where the optical disc 1 employs such a groove recording technique in which data is recorded in the groove. However, the present invention is not limited to this case, and the optical disc 1 can employ a land recording technique in which data is recorded on a land provided between grooves. In addition, a land-groove recording technique can also be employed in which data is recorded on both lands and grooves.

The groove serving as the recording track meanders in accordance with a wobble signal. Thus, the disc drive apparatus for the optical disc 1 irradiates a laser spot onto the groove so as to detect the position of opposite edges of the groove from reflected light of the laser spot. Then the disc drive apparatus extracts variation components of the edge positions with respect to the disc radius direction by moving the laser spot along the recording track groove, thereby reproducing the wobble signal.

The wobble signal has been modulated with address information (a physical address and other additional information) specifying a recording position in the recording track. The disc drive apparatus can perform processing such as address control during data recording/reproduction by demodulating the address information etc., from the wobble signal. Information such as address recorded by a wobbling groove is called ADIP (Address in Pregroove) information.

As PIC (Permanent information & Calibration) information, information on suggested conditions of recording/reproduction laser power and recording conditions such as a laser drive pulse waveform, and information used for copy protection are pre-recorded by a wobbling groove in the pre-recorded information area PR of the reproduction-dedicated area PB. These pieces of information are recorded as reproduction-only information which cannot be rewritten.

In addition, the above PIC information can be recorded by embossed pits or the like.

The management/control information area will be described below.

The data zone serves to allow recording/reproduction of user data.

The data zone includes an inner spare area (ISA) and an outer spare area (OSA) as spare areas which are set at positions preceding and succeeding the data area for user data recording, respectively. When there is a section (sector, cluster) in which data failed to be recorded or from which data failed to be reproduced, due to a defect or the like in personal computer use, the ISA and OSA replace the area. Note that these replace areas may not be set when, for example, real-time recording with a high transfer rate such as video recording is performed.

Data cannot physically be rewritten to a write-once medium. However, data can logically be rewritten through replacement processing. Specifically, when data recorded on an existing block (an area such as a cluster) is attempted to be rewritten, new data is recorded on another block. Then, this block having the new data recorded therein is managed as replacement management information similarly to the case of the above defect replacement, so that overwriting can logically be performed. In this type of data rewriting, a block within the ISA or OSA may be used as a spare area.

The lead-out zone is provided to the outer circumference side of the data zone. This lead-out zone is used as a buffer area in case of an overrun during a seek operation.

DMA (Disc Management Area) information, which will be described below, may be recorded on the lead-out zone as well as the lead-in zone.

In such a one-layer disc as described above, addresses are sequentially recorded from the inner circumference side to the outer circumference side. The disc drive apparatus performs recording/reproduction from the inner circumference side to the outer circumference side.

Figure 3:
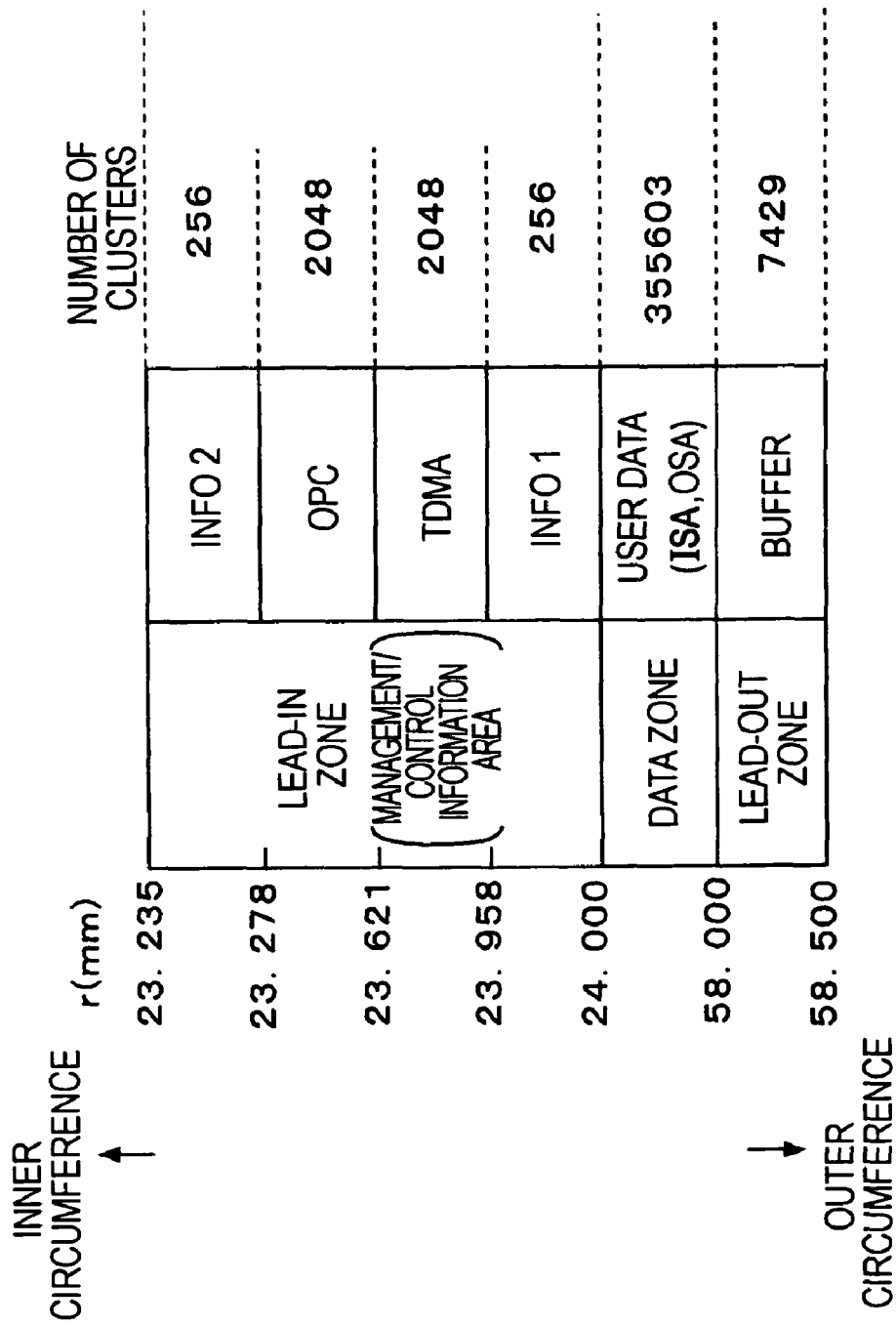
FIG. 3 illustrates a lead-in zone of a disc according to an embodiment of the present invention.

FIG. 3 illustrates positions of the areas within the WO area illustrated in FIG. 2.

As shown in the figure, the WO area occupies a region ranging from the radius of 23.235 mm to the radius of 58.50 mm of the disc 1.

The lead-in zone is allocated to a region inside the radius of 24 mm the disc 1. The data zone is allocated to a region ranging from the radius of 24 mm to the radius of 58 mm of the disc 1, and the lead-out zone is allocated to a region ranging from the radius of 58 mm to the radius of 58.5 mm of the disc 1.

As shown in FIG. 3, in the lead-in zone, the management/control information area is allocated to the region ranging from the radius of 23.235 mm to the radius of 24 mm. In this management/control information area, information areas (INFO 1, INFO 2), a test write area OPC, and a temporary disc management area (TDMA) are provided.

The test write area OPC is allocated to a region ranging from the radius of 23.278 mm to the radius of 23.621 mm of the disc 1. The test write area OPC is used for test writing to be performed when recording/reproduction conditions of recording marks, such as a recording/reproduction laser power, are set. That is, the test write area OPC is provided for adjustment of recording/reproduction conditions.

Each of the information area INFO 1, allocated to a region (23.958 mm-24 mm), and the information area INFO 2, allocated to a region (23.235 mm-23.278 mm) includes a disc management area (DMA) and control data. The disc management area DMA is used for recording or reproducing information for controlling defect information on the disc 1.

A region ranging from the radius of 23.621 mm to the radius of 23.958 mm serves as the temporary disc management area TDMA.

In this embodiment, the optical disc 1 has a track pitch of 0.32 μm and a linear density of 0.12 μm/bit.

Recording/reproduction is performed in units of clusters. One cluster is composed of 64 KB of user data.

In this case, in the lead-in zone, 256 clusters are allocated to the information area INFO 2, 2048 clusters to the test write area OPC, 2048 clusters to the temporary disc management area TDMA, and 256 clusters to the information area INFO 1.

The data zone for user data recording/reproduction is provided with 355603 clusters. Thus, the recording capacity for user data is approximately 23.3 GB (64 KB×355603).

The lead-out zone contains 7429 clusters.

Figure 4:
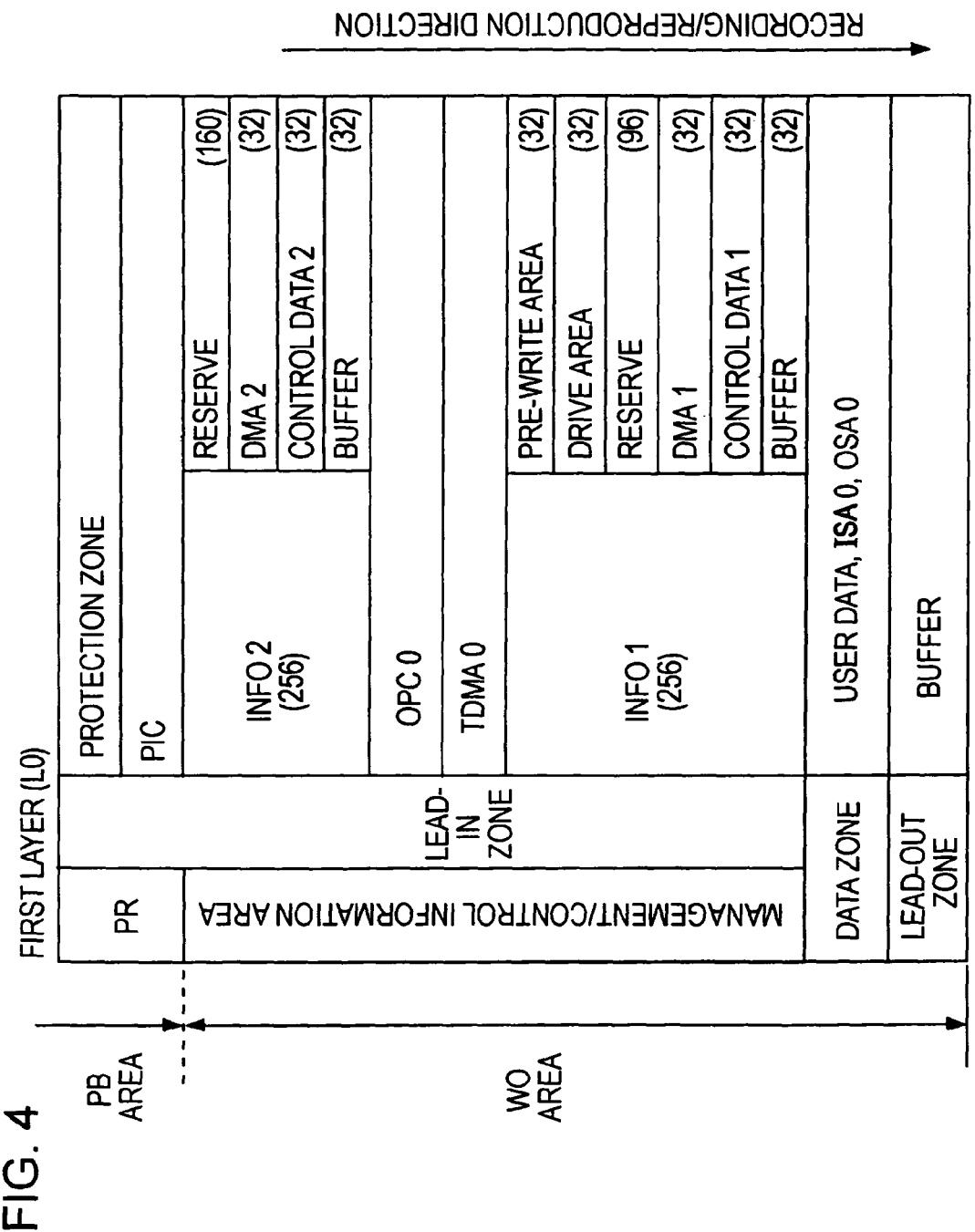
FIG. 4 illustrates an area structure of a one-layer disc according to an embodiment of the present invention.

FIG. 4 illustrates in detail the pre-recorded information area PR and the management/control information area of the two-layer disc illustrated in FIG. 2.

The pre-recorded information area PR is provided in the reproduction-dedicated area PB, as described above. As shown in FIG. 4, a region allocated to the inner circumference side in the reproduction-dedicated area PB serves as a protection zone, and the PIC information described above is recorded by a wobbling groove in the outer circumference side in the reproduction-dedicated area PB.

The position of each area or zone in terms of the radius of the optical disc 1 is illustrated in FIG. 3. As shown in FIG. 4, the management/control information area of the one-layer disc includes the information area INFO 2, a test write area OPC 0, a TDMA 0, and the information area INFO 1 in that order from the inner circumference side to the outer circumference side.

Out of the 256 clusters of the information area INFO 2, 160 clusters are allocated as a reserve area, 32 clusters as a disc management area DMA 2, 32 clusters as control data 2, and 32 clusters as a buffer.

Out of the 256 clusters of the information area INFO 1, 32 clusters are allocated as a pre-write area, 32 clusters, as a drive area, 96 clusters as a reserve area, 32 clusters as a disc management area DMA 1, 32 clusters as a control data 1, and 32 clusters as a buffer.

Identical information is recorded in each of the control data 1 of the information area INFO 1 and the control data 2 of the information area INFO 2.

This identical information includes a disc type, a disc size, a disc version, a layer structure, a channel bit length, a BCA information, a transfer rate, data zone position information, a recording linear velocity, recording/reproduction laser power information, etc.

Identical information is recorded in each of the two DMAs (DMA 1, DMA 2) of the individual information areas INFO 1 and INFO 2. This identical information serves as replacement management information for managing defect replacement and logical rewriting, etc.

In general, in the field of disc recording/reproduction systems, DMAs used for recording replacement management information for defect management are called "defect management areas". However, the DMAs in the disc 1 according to this embodiment can record not only such replacement management information for a defective section but also management information for implementing the logical data rewriting described above in the write-once disc. Thus, the DMA in this embodiment is referred to as a "disc management area".

In order to carry out defect management and data rewriting through replacement processing, it is necessary that a content of the DMA be updated in accordance with the data rewriting, etc. The TDMA (Temporary Disc Management Area) mentioned above is provided for this purpose.

The replacement management information to be recorded in the DMA is first recorded in the TDMA. In response to replacement processing performed for data rewriting or due to the presence of a defect, the replacement management information is updated. The update is performed by adding replacement management information to the TDMA.

Thus, the DMA is not used until the disc 1 is finalized, and replacement management is performed using the TDMA. In the write-one disc according to an embodiment of the present invention, recording is not allowed after finalization processing has been performed. The newest replacement management information recorded in the TDMA at the time of the finalization processing is recorded in the DMA, and thereafter the replacement management using the DMA is enabled.

Information contents to be recorded in the DMA (and TDMA) will be described in detail below.

The buffer in the information area INFO 1 serves to separate the control data 1 and the data zone. The buffer in the information area INFO 2 serves to separate the control data 2 and the test write area OPC 0.

After the optimum recording/reproduction conditions are detected, the drive area in the information area INFO 1 is used for recording/reproducing the conditions as data.

The pre-write area in the information area INFO 1 is used for adjustment of focus and spherical aberration which is performed by the disc drive apparatus.

For example, when data is recorded on the recording layer for the first time, or when a disc having no data recorded thereon is inserted into a drive, data used for adjustment processing is recorded in the pre-write area. Thus, in recording/reproduction performed the subsequent time, the focus or spherical aberration can be precisely adjusted while the data used for adjustment is being reproduced. With this arrangement, adjustment of focus and spherical aberration for recording/reproduction can be performed in a short time. Hereinafter, the data used for the adjustment is referred to as adjustment data.

Figure 5:
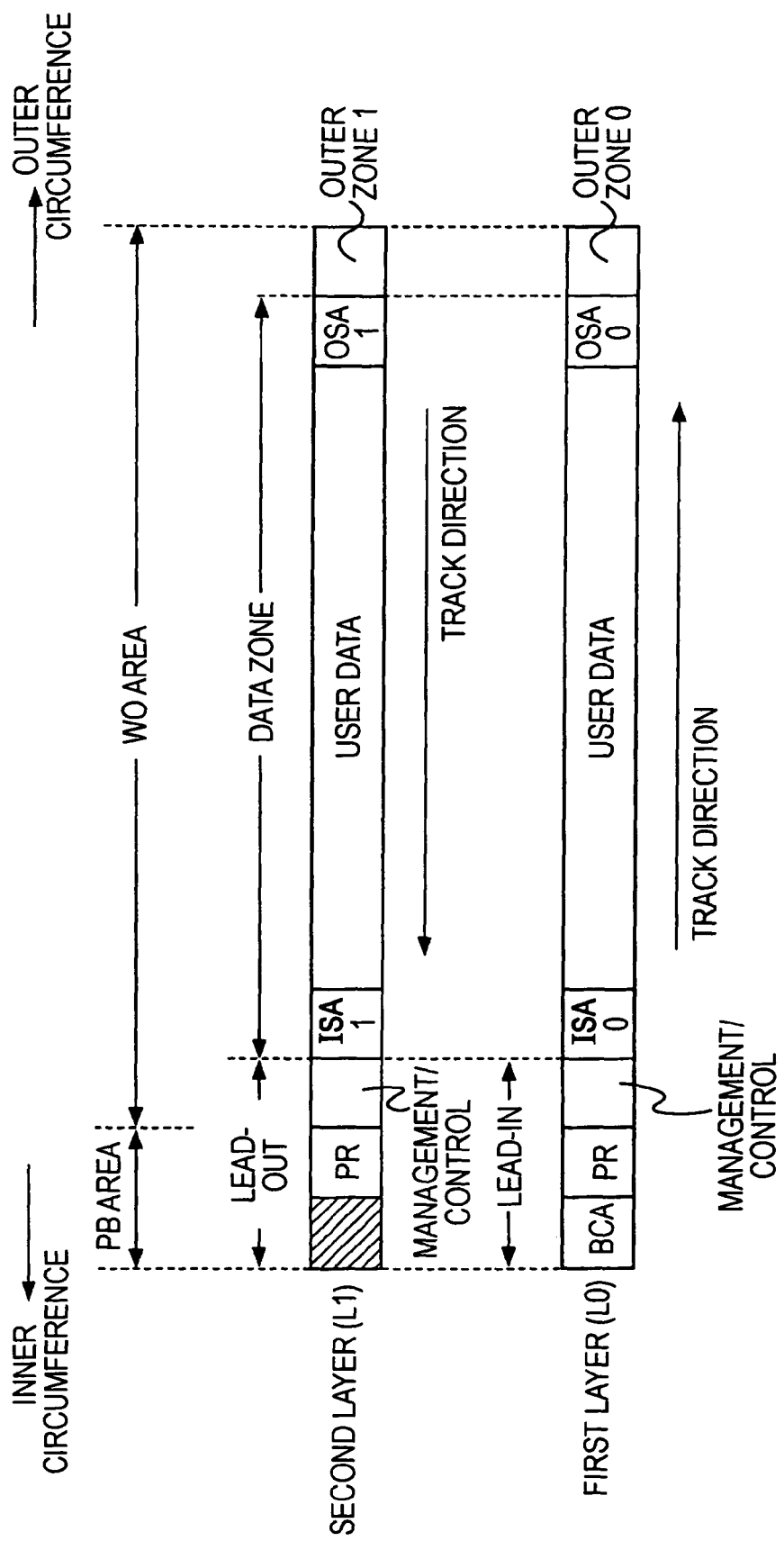
FIG. 5 illustrates an area structure of a two-layer disc according to an embodiment of the present invention.

Referring now to FIG. 5, an example of a disc layout of the two-layer disc is illustrated.

The first recording layer L0 of the two-layer disc has a disc layout similar to that of the one-layer disc illustrated in FIG. 2. However, the area corresponding to the lead-out zone of the one-layer disc does not serve as the lead-out indicative of the end of recording/reproduction, and thus is used as an outer zone 0.

The second recording layer L1 of the two-layer disc is composed of an outer zone 1, a data zone, and a lead-out zone which are arranged in that order from the outer circumference side to the inner circumference side of the disc 1.

In this case, the lead-out zone is allocated to a region inside the radius of 24 mm of the disc 1. A BCA indicated by shading is allocated to a region ranging from the radius of 21 mm to the radius of 22.2 mm, a pre-recorded information area PR is allocated to a region ranging from the radius of 22.2 mm to the radius of 23.1 mm, and a management/control information area is allocated to a region ranging from the radius of 23.1 mm to the radius of 24 mm.

The data zone is allocated to a region ranging from the radius of 24 mm to the radius of 58 mm of the disc 1, and the outer zone is allocated to a region ranging from the radius of 58 mm to the radius of 58.5 mm of the disc 1.

In this case, an area corresponding to the BCA is provided on the second recording layer L1. However, a unique ID is not recorded in this area.

This is because there may be a case where damage is present in the corresponding are (shaded area) of the second recording layer L1 which is disposed at the same position as the BCA of the first recording layer L0 along the thickness direction when bar-code data is recorded in a radial direction using a recording technique in which the recording layer is burned with a high-output laser. In this case, even if BCA information such as a unique ID is newly recorded on the second recording layer L1, reliability of recording may not be ensured. In other words, the reliability of the BCA in the first recording layer L0 can be enhanced by not performing recording of BCA information on the second recording layer L1.

On the other hand, identical information is recorded in both of the pre-recorded information areas PRs of the first recording layer L0 and the second recording layer L1, so that the reliability of management information can be enhanced and so that accessibility can be increased for every recording layer.

In the data zones of the first recording layer L0 and the second recording layer L1, inner spare areas ISA 0 and ISA 1 are set at the inner circumference ends of the user data, and outer spare areas OSA 0 and OSA 1 are set at the outer circumference ends of the user data, respectively. Each of these areas serves as a spare area for replacing for a section (sector, cluster) in which data has failed to be recorded or from which data has failed to be reproduced due to the presence of a defect or the like. Note that these spare areas may not be set when, for example, real-time recording with a high transfer rate such as video recording is performed.

The outer zones are used as buffer areas in case of an overrun which occurs during a seek operation. In addition, a DMA may be provided in the outer zone so that replacement management information is recorded or reproduced.

In the first recording layer L0 of the two-layer disc, addresses are sequentially recorded from the inner circumference side to the outer circumference side, and recording/reproduction is performed from the inner circumference side to the outer circumference side.

In the second recording layer L1, addresses are sequentially recorded from the outer circumference side to the inner circumference side, and recording/reproduction is performed from the outer circumference side to the inner circumference side.

Recording/reproduction is performed from the inner circumference side to the outer circumference side in the first recording layer L0, and recording/reproduction is performed the outer circumference side to the inner circumference side in the second recording layer L1. With this arrangement, when recording/reproduction is completed at the outer circumference end of the first recording layer L0, the recording/reproduction can be continued from the outer circumference end of the second recording layer L1.

This indicates that recording/reproduction can be continued without a full seek operation from the outer circumference to the inner circumference for transitioning from the first recording layer L0 to the second recording layer L1. This arrangement permits a long-time operation of real-time recording with a high transfer rate such as video recording.

Figure 6:
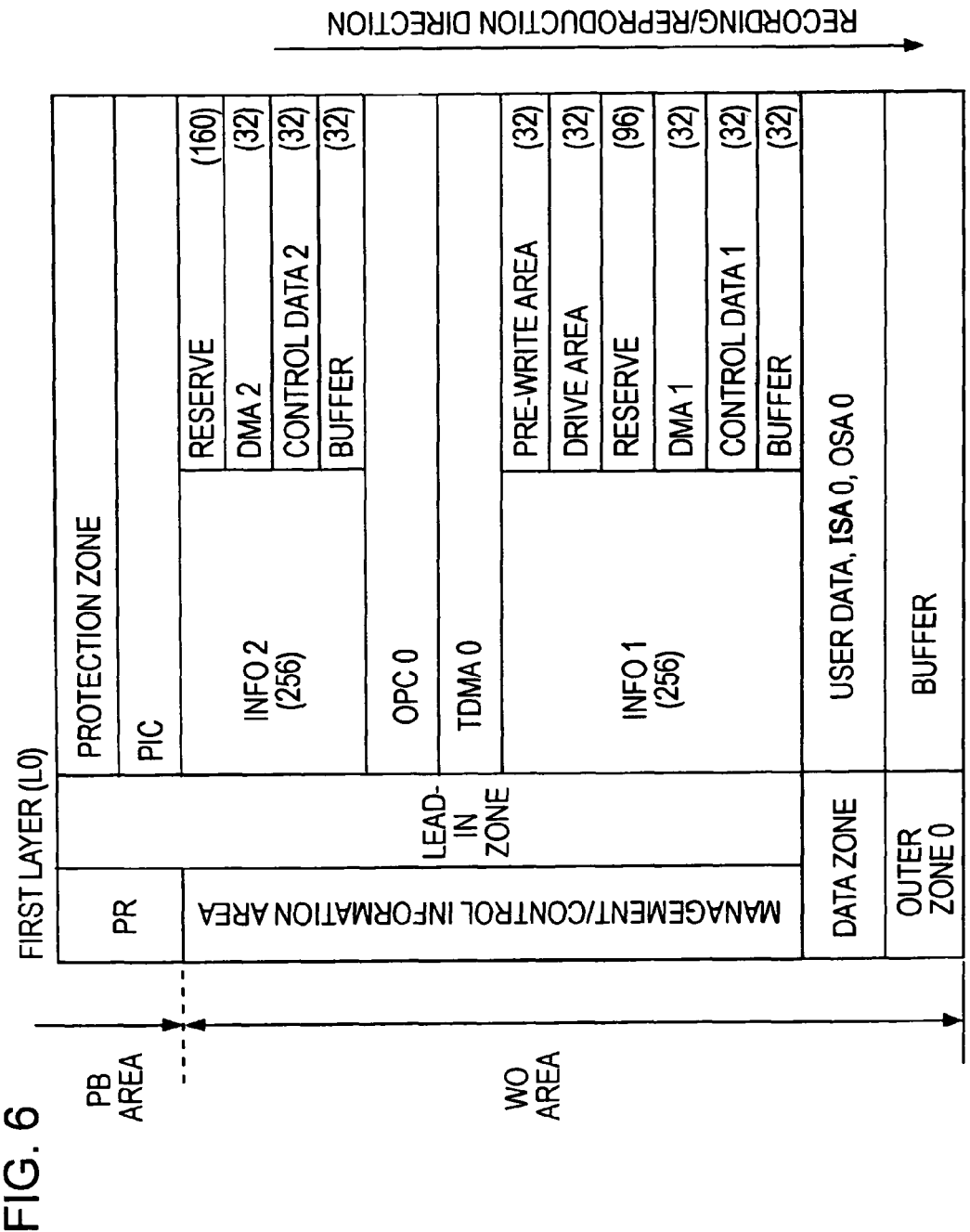
FIG. 6 illustrates an area structure of a first recording layer of a two-layer disc according to an embodiment of the present invention.
Figure 7:
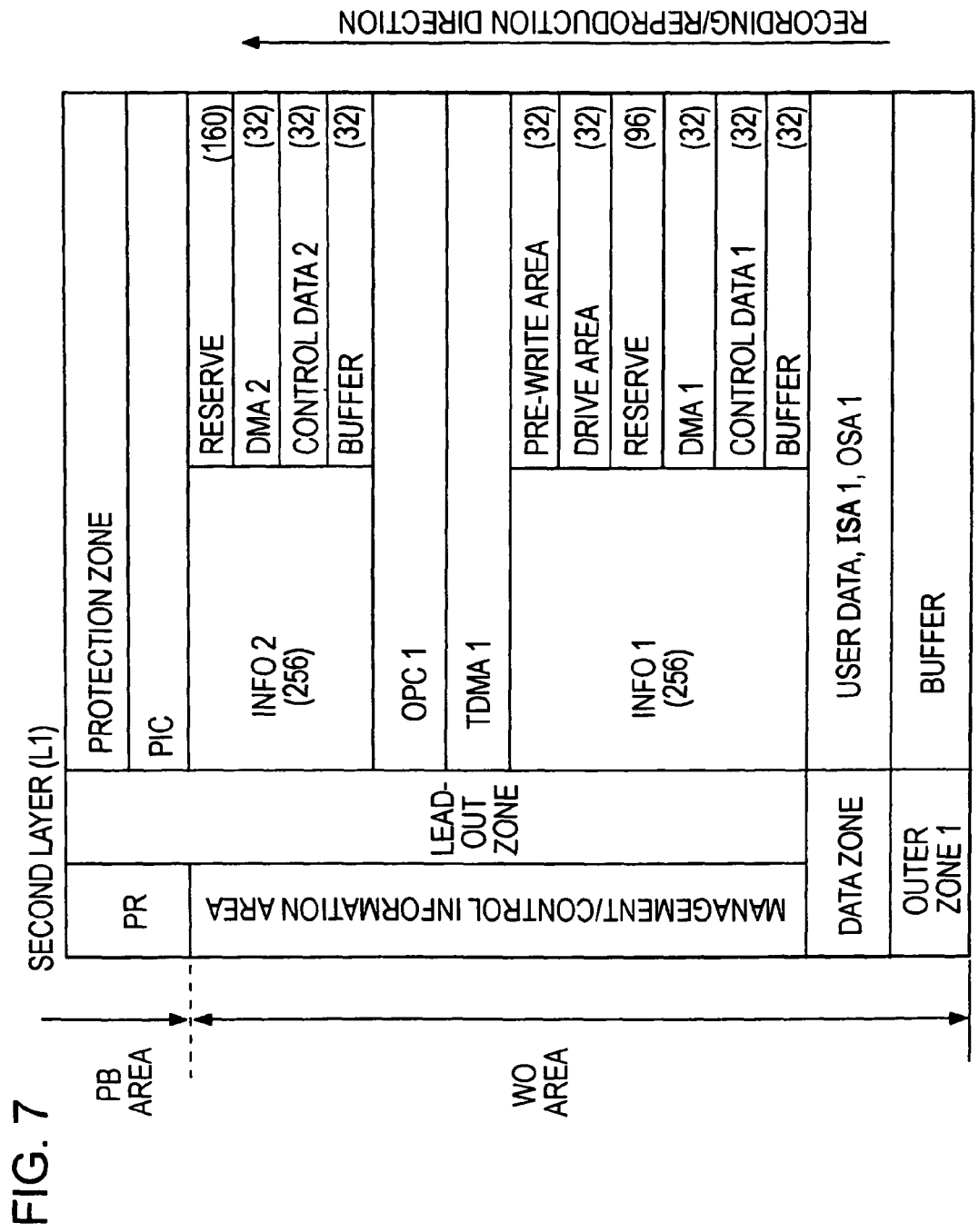
FIG. 7 illustrates an area structure of a second recording layer of a two-layer disc according to an embodiment of the present invention.

In FIGS. 6 and 7, area structures of the first recording layer L0 and the second recording layer L1 are illustrated, respectively, in the same manner as FIG. 4.

The area structure of the first recording layer L0 of the two-layer disc illustrated in FIG. 6 is generally the same as that of the one-layer disc illustrated in FIG. 4. However, the outermost circumference part of the first recording layer L0 of the two-layer disc does not serve as the lead-out zone but as the outer zone 0. The recording/reproduction is performed from the inner circumference side to the outer circumference side as indicated by an arrow in FIG. 6.

In the two-layer disc, the area structure of the second recording layer L1 illustrated in FIG. 7 is generally the same as that of the first recording layer L0. However, the innermost circumference part serves as the lead-out zone. Thus, an information area INFO 2, a test write area OPC 1, a TDMA 1, and an information area INFO 1 are arranged in that order from the inner circumference side to the outer circumference side. The recording/reproduction direction is the radially inward direction as indicated by an arrow in FIG. 7.

As can be seen from the FIGS. 6 and 7, a pre-write area is provided in each of the information areas INFO 1s of the first recording layer L0 and the second recording layer L1.

Figure 8:
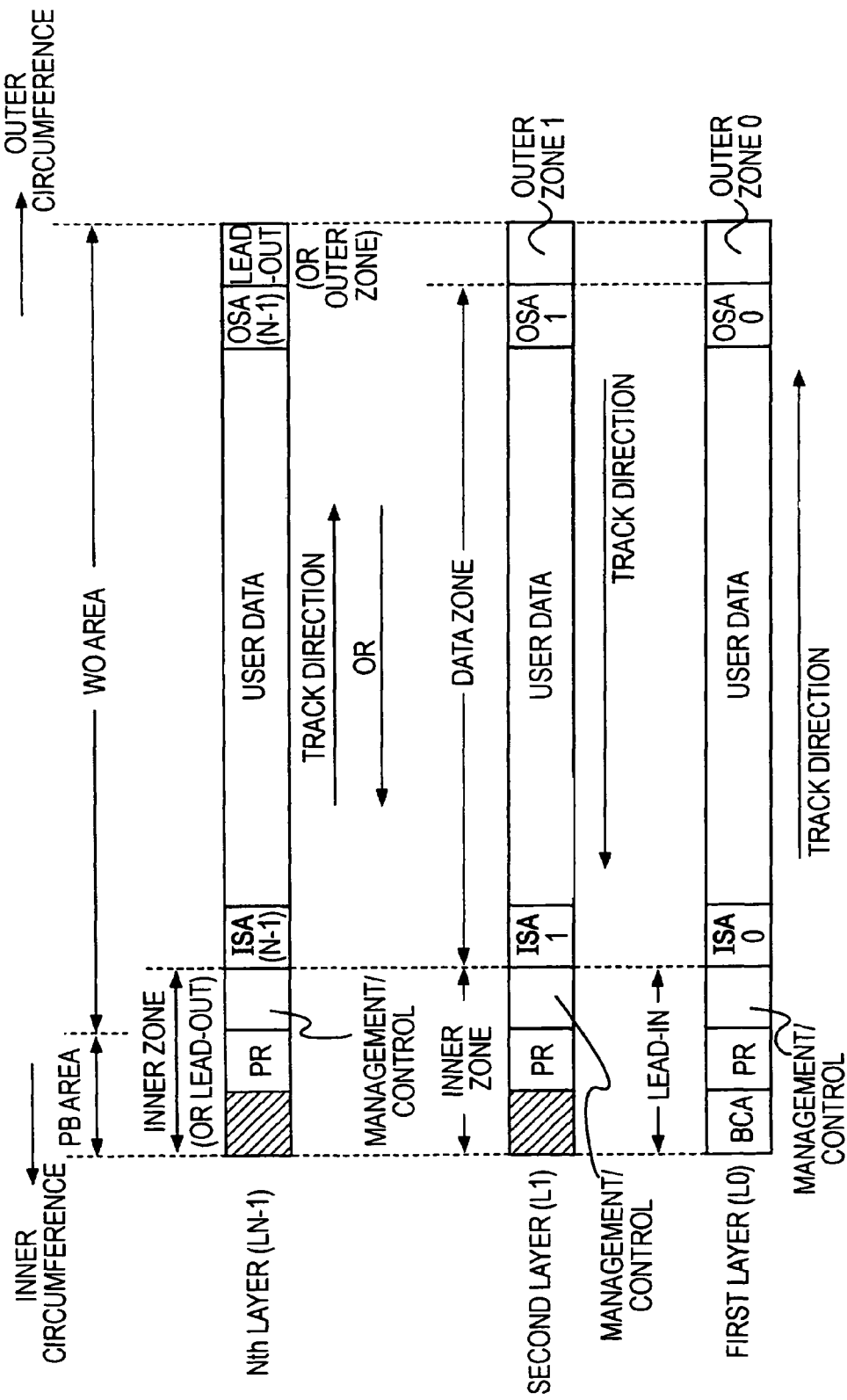
FIG. 8 illustrates an area structure of an N-layer disc according to an embodiment of the present invention.

Referring to FIG. 8, an example of a disc layout of the N-layer disc (i.e., a disc having three or more recording layers, in this embodiment) is illustrated.

A first recording layer L0 of the N-layer disc has generally the same disc layout as the one-layer disc and the two-layer disc. However, a region on the first recording layer L0 of the N-layer disc which corresponds to the lead-out zone on the first recording layer L0 of the one-layer disc serves as an outer zone 0.

The disc layout of the second recording layer L1 of the N-layer disc is generally the same as that of the second recording layer L1 of the two-layer disc. However, the innermost circumference part on the second recording layer L1 of the N-layer disc which corresponds to the lead-out zone on the second recording layer L1 of the two-layer disc serves as an inner zone 1, since recording/reproduction is not terminated at this part.

In the N-layer disc, the layout of an Nth recording layer L(N−1) is generally the same as that of the second recording layer L1. Information such as a unique ID is not recorded in the area of the Nth recording layer L(N−1) which corresponds to the BCA of the first recording layer L0, for the same reason as in the case of the second recording layer L1.

On the other hand, identical information is recorded on the pre-recorded information areas PRs of the first recording layer L0 to the Nth recording layer L(N−1), so that the reliability of management information can be enhanced and accessibility can be increased for every recording layer.

In the data zones of the first recording layer L0 to the Nth recording layer L(N−1), inner spare areas ISA 0 to ISA (N−1) are set to the inner circumference ends of the user data, and outer spare areas OSA 0 to OSA (N−1) are set to the outer circumference ends of the user data, respectively. Each of these areas serves as a spare area for replacing a section (sector, cluster) on which data is failed to be recorded or from which data is failed to be reproduced due to the presence of a defect or the like. Note that these spare areas may not be set when, for example, real-time recording with a high transfer rata such as video recording is performed.

When "N" is an odd number, an inner zone is provided at the inner circumference side of the Nth recording layer L(N−1), and a lead-out zone is provided at the outer circumference side of the Nth recording layer L(N−1).

In this case, addresses are sequentially recorded from the inner circumference side to the outer circumference side, and recording/reproduction is performed from the inner circumference side to the outer circumference side.

When "N" is an even number, the lead-out zone is provided at the inner circumference side of the Nth recording layer L(N−1), and an outer-zone is provided at the outer circumference of the Nth recording layer L(N−1).

In this case, the addresses are sequentially recorded from the outer circumference side to the inner circumference side, and recording/reproduction is performed from the outer circumference-side to the inner circumference side.

With this arrangement, a full seek operation from the outer circumference to the inner circumference is not necessary, as in the case of the two-layer disc. Thus, recording/reproduction can sequentially and continuously be performed from the inner circumference to the outer circumference (L0), from the outer circumference to the inner circumference (L1), . . . , and then, from the inner circumference (when N is an odd number, i.e., the outer circumference when N is an even number) to the outer circumference (when N is an odd number, i.e., the inner circumference when N is an even number) (L(N−1)). This arrangement permits a long-time operation of real-time recording with a high transfer rate such as video recording.

A management/control information area is provided in the inner zone or the lead-out zone allocated at the inner circumference side of each of the third to Nth recording layers, similarly to the first recording layer L0 and the second recording layer L1. The management/control information area can also include an information area INFO 2, a test write area OPC, a TDMA, and an information area INFO 1.

The outer zone or the lead-out zone allocated to the outer circumference side of each of the third to Nth recording layers is used as a buffer area, and may also be provided with a DMA so that replacement management information is recorded or reproduced.

Replacement management information intended for every recording layer is to be recorded in each DMA provided at the inner circumference side and the outer circumference side. That is, identical information is to be recorded in all of the DMAs.

All of the replacement management information recorded in the individual recording layers can be uniformly handled by recording the replacement management information of the first to Nth recording layers in any of the DMAs (i.e., DMA 1 and DMA 2) provided in each of the first to Nth recording layers.

In addition, in the case of the N-layer disc, the management/control information area is disposed on every recording layer. A pre-write area is provided in the information area INFO 1 in each of the management/control information areas, which is not illustrated in the drawings. Thus, the pre-write area, which is used for adjusting focus and spherical aberration, is prepared in every recording layer.

Figure 9B:
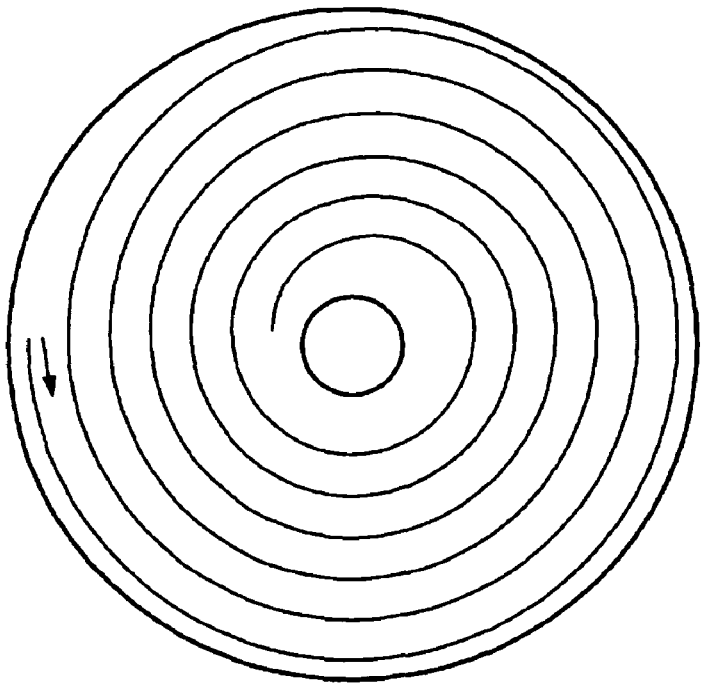
FIGS. 9A and 9B illustrate spiral directions of the track of a multilayer disc according to an embodiment of the present invention.
Figure 9A:
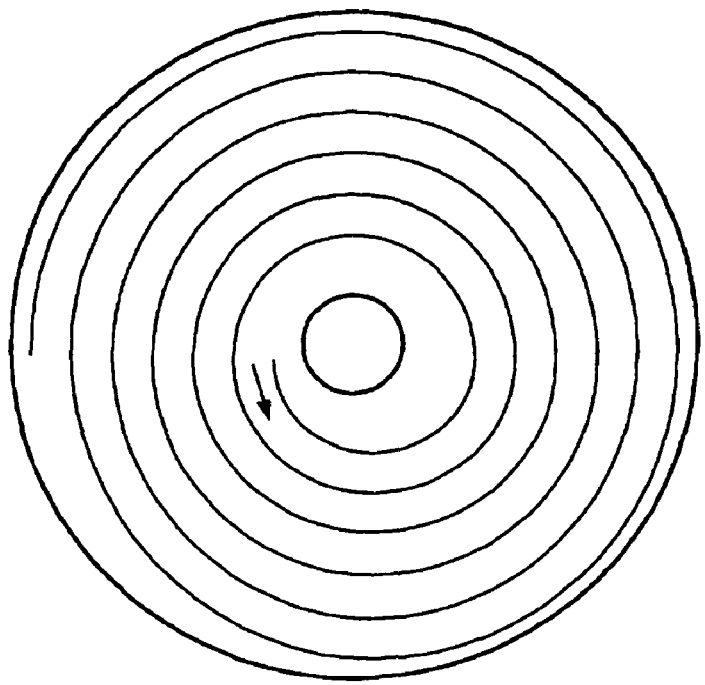

FIGS. 9A and 9B illustrate spiral directions of groove tracks in recording layers.

The groove track of the one-layer disc, when viewed from the side from which the optical beam is incident (i.e., the cover layer CVL side), spirally extends counterclockwise from the inner circumference to the outer circumference, as shown in FIG. 9A.

In the two-layer disc, as in the case of the one-layer disc, the groove track on the first recording layer L0 spirally extends counterclockwise from the inner circumference to the outer circumference.

On the other hand, the groove track on the second recording layer L1, when viewed form the side from which the optical beam is incident (i.e., the cover layer CVL side), spirally extends counterclockwise from the outer circumference to the inner circumference, as shown in FIG. 9B.

In the case of the N-layer disc, the groove track on each of the odd-numbered layers (the first recording layer L0, the third recording layer L2, etc.) spirally extends counterclockwise from the inner circumference to the outer circumference, as shown in FIG. 9A, similarly to the one-layer disc.

On the other hand, the groove track on each of the even-numbered layers (the second recording layer L1, the fourth recording layer L3, etc.) spirally extends counterclockwise from the outer circumference to the inner circumference, as shown in FIG. 9B.

With this groove track structure as described above, recording/reproduction can be performed on every recording layer with the same disc rotation direction.

Specifically, recording/reproduction can sequentially and continuously be performed from the inner circumference to the outer circumference (L0), from the outer circumference to the inner circumference (L1), and then, from the inner circumference (when N is an odd number, i.e., the outer circumference when N is an even number) to the outer circumference (when N is an odd number, i.e., the inner circumference when N is an even number) (L(N−1)). This arrangement is preferable in real-time recording with a high transfer rate such as video recording.

Regarding one recording layer, the recording/reproduction capacity of a disc of 12 cm in diameter is approximately 23.3 GB, when the disc has a track pitch of 0.32 μm and a linear density of 0.12 μm/bit, and a format efficiency of 82% with a recording/reproduction unit of a 64 KB data block, as described above.

This indicates that 355603 clusters are provided in the data zone.

Address information is represented by a 3-bit layer address and a 19-bit layer internal address (a RUB address).

In an odd-numbered recording layer, when two address bits are allocated in one cluster, the 19-bit RUB address of the data zone is "020000h" at the radius of 24 mm of the disc 1, and "17b44ch" at the radius of 58 mm of the disc 1 (h represents hexadecimal).

Addresses in an even-numbered recording layer are expressed by the complements of the addresses in the odd-numbered recording layer.

Thus, the 19-bit RUB address of the data zone of an even-numbered recording layer is "084bb3h" at the radius of 58 mm of the disc 1, and "1dfffh" at the radius of 24 mm of the disc 1.

Specifically, the addresses are sequentially ordered from the inner circumference to the outer circumference in each odd-numbered recording layer and sequentially ordered from the outer circumference to the inner circumference in each even-numbered recording layer.

The addresses in each even-numbered recording layer are obtained by complementing the address in each odd-numbered recording layer. This arrangement allows the RUB addresses to be expressed using the same number of bits in every recording layer and provides a positional relationship between an address in each odd-numbered recording layer and an address in each even-numbered recording layer in terms of the radius of the disc.

[3. DMA]

An example of a structure of a DMA for recording replacement management information is illustrated in FIG. 10.

In this example, the size of the DMA is assumed to be 32 clusters. However, the size of the DMA is not limited to being 32 clusters.

One cluster is composed of 65536 bytes which is employed as the minimum unit for recording. A unit called a sector (or data frame) is composed of 2048 bytes. Thus, one cluster is composed of 32 sectors (or 32 data frames). The sector and the data frame are the same in terms of the size of user data contained therein. However, the sector is a physical data unit, and the data frame is a logical data unit.

The addresses are allocated in units of sectors. In this embodiment, a physical sector address is referred to as a physical sector number (PSN) and a logical sector address is referred to as a logical sector number (LSN).

In FIG. 10, a cluster number is assigned to each of the 32 clusters (cluster numbers 1 to 32) so that a data position corresponding to each content in the DMA is indicated. The size of each content is represented by the number of clusters.

In the DMA, a section composed of four clusters (cluster numbers 1 to 4) has recorded therein detailed information on a disc as a disc definition structure (DDS).

Contents of this DDS will be described with reference to FIG. 11 below. The DDS has a size of one cluster, and recording of the DDS is repeated four times in the four-cluster section.

A four-cluster section (cluster numbers 5 to 8) is used as a first recording area of a defect list DFL (DFL #1). The defect list DFL is constituted by data having a size of four clusters in which each replacement address information (a DFL entry described below) is listed.

A four-cluster section (cluster numbers 9 to 12) is a second DFL recording area (DFL #2).

Likewise, a third DFL recording area (DFL #3) to a seventh DFL recording area (DFL #7) are provided each of which is composed of four clusters. Thus, the DFL #7 are composed of clusters having the cluster numbers 29 to 32.

Thus, seven DFL recording areas (DFL #1 to DFL #7) are prepared in the 32-cluster DMA.

In order to write contents of such a DMA to a write-once optical disc such as the disc 1 according to an embodiment of the present invention, finalization processing has to be performed. Thus, it is configured such that the individual DFLs

1 to #7 have the same contents with a view to achieving compatibility. A structure of the defect list DFL will be described below.

Figure 11:
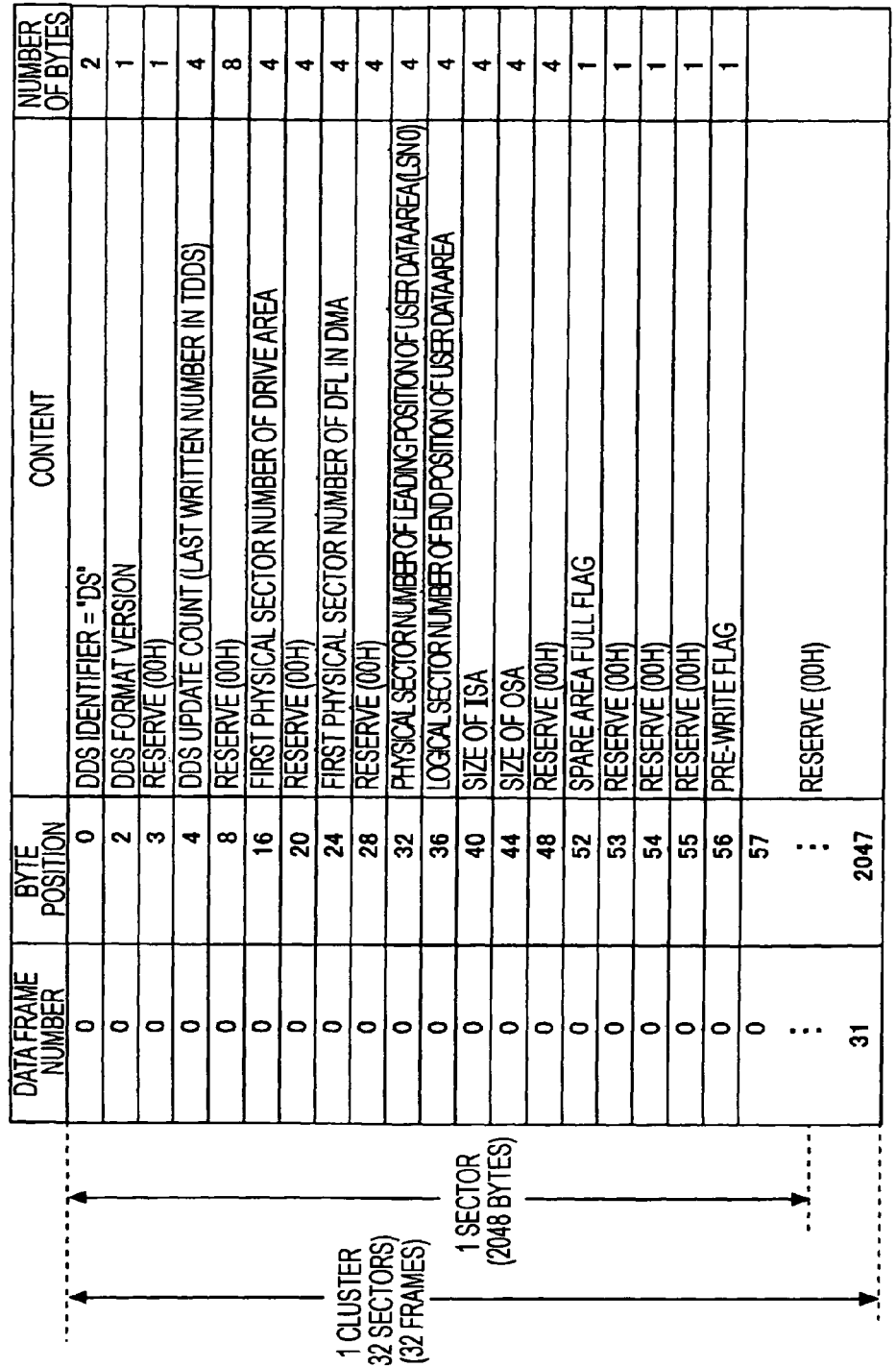
FIG. 11 illustrates a DDS of a disc according to an embodiment of the present invention.

Referring to FIG. 11, contents of a DDS to be recorded in the head of the DMA illustrated in FIG. 10.

As described above, the DDS has a size of one cluster (65536 bytes).

In FIG. 11, the leading byte of the 65536-byte DDS is expressed as byte 0 such that each byte position is indicated. "Number of bytes" in the figure indicates a size of each data content.

A DDS identifier "DS" serving as an indication of a DDS cluster is recorded in the first two bytes represented by byte positions 0 to 2 shown in FIG. 11.

A format version of the DDS is recorded in one byte represented by byte position 2.

A DDS update count indicating the number of DDS updates is recorded in four byte represented by byte positions 4 to 7. As described above, the DMA is not updated, but replacement management information is written to the DMA when finalization processing is performed. Thus, recording of the replacement management information is performed using the TDMA until the finalization processing is performed. Accordingly, the number of updates performed on a DDS written to the TDMA (a temporary DDS (TDDS)) is recorded in the bytes represented by the byte positions when the finalization processing is performed.

A first PSN of the drive area is recorded in four bytes represented by byte positions 16 to 19.

A first PSN of the defect list DFL in the DMA is recorded in four bytes represented by byte positions 24 to 27.

In four bytes represented by byte positions 32 to 35, the head position of the user data area in the data zone, i.e., the position of LSN "0", is indicated using a PSN.

In four bytes represented by byte positions 36 to 39 the end position of the user data area in the data zone is indicated using an LSN.

The size of the ISA in the data zone is recorded in four bytes represented by byte positions 40 to 43.

The size of the OSA in data zone is recorded in four bytes represented by byte positions 44 to 47.

A spare area full flag indicating whether or not data writing can be executed using the ISA, OSA is set in one byte represented by byte position 52. The spare area full flag serves to indicate that all of the ISA or OSA is used.

A pre-write area flag is provided in one byte represented by byte position 56.

A structure of this one-byte pre-write area flag is illustrated in FIG. 12. Bit 0 to bit 7 in the one byte correspond to layer addresses 0 to 7, i.e., the first recording layer L0 to the eighth recording layer L7. A bit value "0" or "1" is assigned to represent whether or not data used for adjustment (adjustment data) has been recorded in the pre-write area of the corresponding recording layer. For example, the bit value "0" indicates that no data has been recorded in the pre-write area, and the bit value "1" indicates that the adjustment data has been recorded in the pre-write area.

As shown in FIG. 12, the value of bit 0 indicates that the adjustment data has been recorded in the pre-write area in the management/control information area of the first recording layer L0.

Likewise, the values of bit 1 to bit 8 represent whether or not the adjustment data has been recorded in the individual pre-write areas of the second recording layer L1 to the eighth recording layer L7, respectively.

Now, a structure of the defect list DFL will be described with reference to FIG. 13.

In the figure, cluster number and data frame number indicate a cluster number in the DFL and a sector unit of 2048 bytes, respectively. "Byte position in data frame" refers to a byte position in each data frame.

In the DFL, a DFL header for recording management information of the DFL is allocated at byte positions 0 to 63.

This DFL header includes information indicative of a DFL cluster, a version, the number of DFL updates, the number of entries of DFL information blocks, etc.

A list of defects, which is composed of a plurality of information blocks, is provided at byte positions 64 and the subsequent byte positions. The size of each information block is 8 bytes. Thus, when there is N information blocks, the size of the list of defects is N×8 bytes.

One information block serves as one piece of replacement information, i.e., the DFL entry mentioned above.

This DFL entry refers to replacement information for a defective section and can also serve as replacement information used when data rewriting is performed through replacement processing.

The list of defects is composed of a plurality of DFL entries. The total number of the DFL entries in a one-layer disc is 32759 at maximum.

A temporary defect list terminator indicating the end of the list of defects is recorded in eight bytes subsequent to the list of defects. The remaining bytes in the cluster are filled with zeros.

Figure 14:
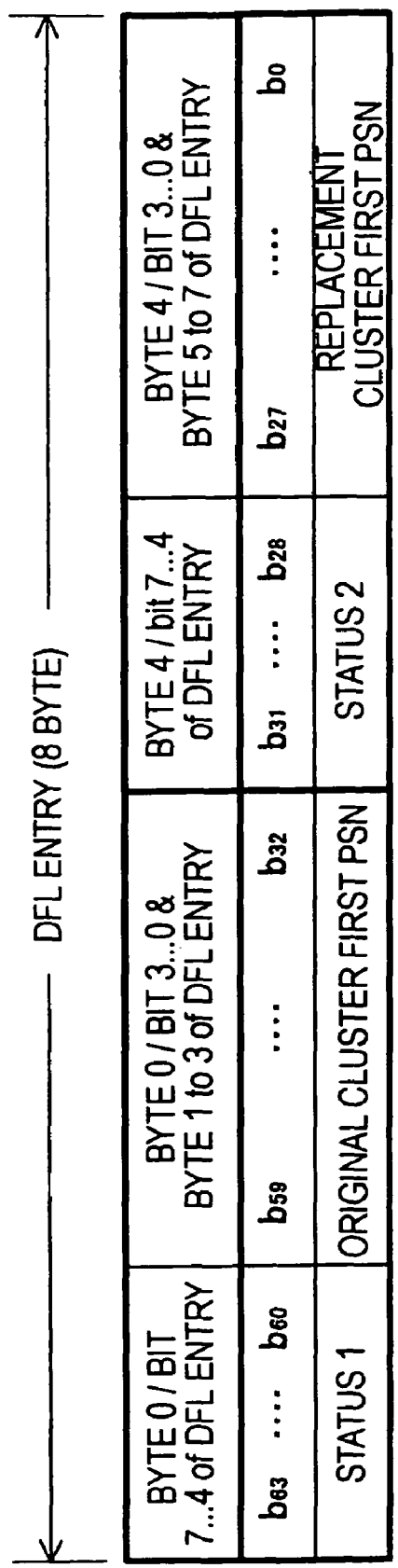
FIG. 14 illustrates a DFL entry of a disc according to an embodiment of the present invention.

A structure of the 8-byte DFL entry as an information block is illustrated in FIG. 14.

Out of the 8 bytes (64 bits) of the DFL entry, four bits (b63 to b60) are used for Status 1 which indicates information on a type of the DFL entry. For example, Status 1 indicates whether the entry serves as normal replacement information or as a defect cluster which is not intended for replacement.

28 bits (b59 to b32) of the 8-byte DFL entry are used for the address of a cluster to be replaced (original cluster first PSN).

Four bits (b31 to b28) are used for Status 2.

28 bits (b27 to b0) are used for the address of a cluster that will replace the cluster to be replaced (replacement cluster first PSN).

Normally, replacement processing for one cluster is represented by the address of the cluster to be replaced (original cluster) and the address of the cluster that will replace the cluster to be replaced (replacement cluster) which are recorded in the DFL entry. Specifically, replacement processing based on defect detection or replacement processing for data rewriting is indicated. The first PSN of the replacement cluster normally designates an address in the spare areas ISA or OSA.

The replacement management information is recorded in the DMA by employing such data structure described above. As described above, such replacement management information is not recorded in the DMA until finalization processing is performed on the disc 1. Before the finalization processing, the replacement management information is added to the TDMA so as to be updated. Then the newest replacement management information recorded in the TDMA is written to the DMA at the time of the finalization processing.

[4. Structure of Disc Drive Apparatus]

Figure 15:
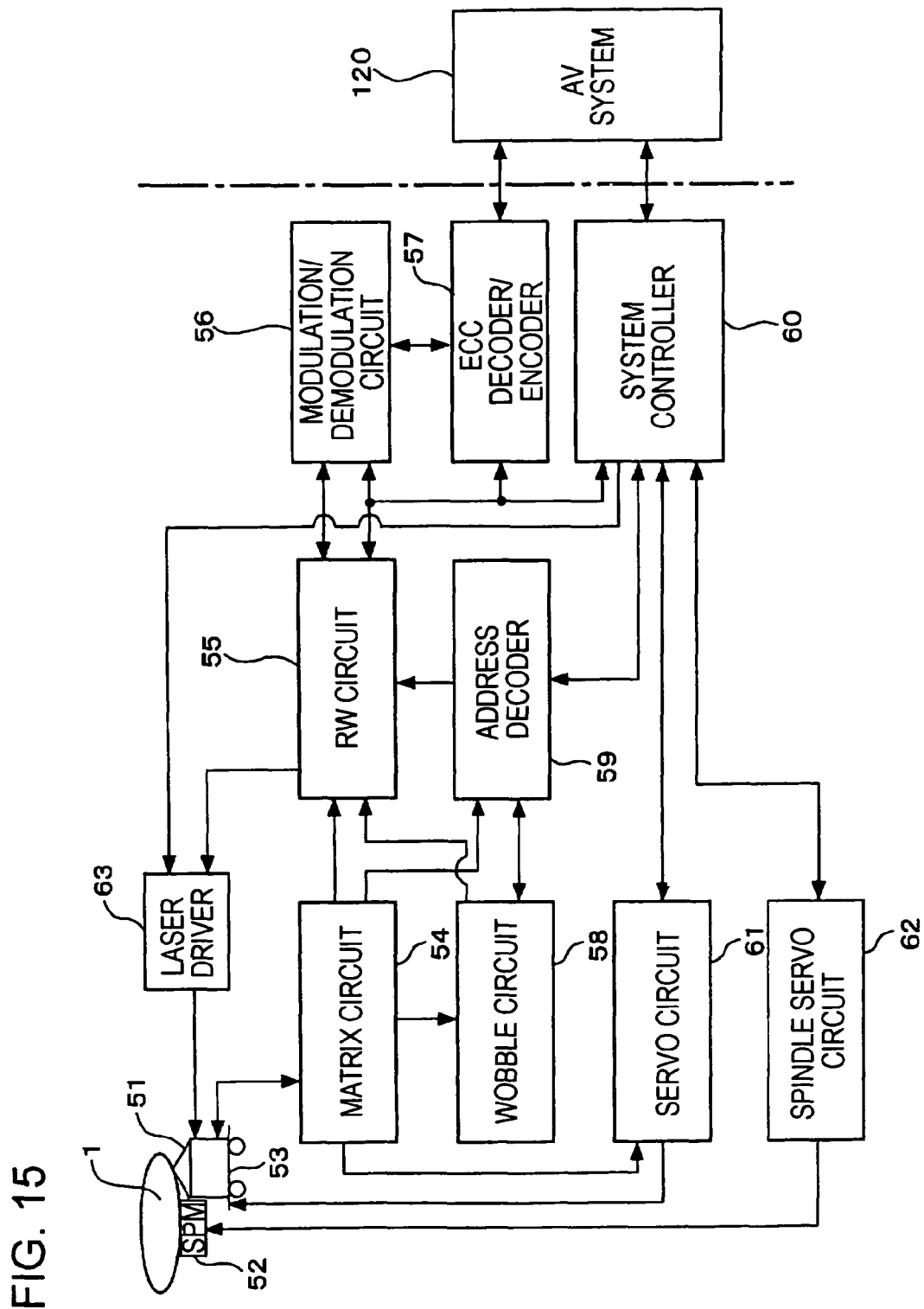
FIG. 15 is a block diagram illustrating a configuration of a disc drive apparatus according to an embodiment of the present invention.

Referring now to FIG. 15, a structure of a disc drive apparatus according to an embodiment of the present invention will be described. The disc drive apparatus performs recording/reproduction using the disc 1 described above.

The disc 1 is mounted on a turntable (not shown) and driven by a spindle motor 52 so as to rotate at a constant linear velocity (CVL) during a recording/reproduction operation.

ADIP information recorded as a wobble of the groove track on the disc 1 is read using an optical pickup (an optical head) 51.

In recording, user data is recorded as, for example, dye-change pits on the track by the optical pickup 51. In reproduction, the recorded dye-change pits are read by the optical pickup 51.

The optical pickup 51 includes a laser diode serving as a laser light source, a photodetector for detecting reflected light, and an objective lens serving to irradiate laser light onto the disc 1. The optical pickup 51 also includes an optical system for irradiating the laser light onto a recording surface of the disc 1 through the objective lens, and guiding reflected light to the photodetector, which will be described below.

The laser diode generates a so-called blue laser with a wavelength of 405 nm. The optical system has an NA (numerical aperture) of 0.85.

In the optical pickup 51, the objective lens is supported by a biaxial mechanism so as to be movable in the tracking direction and the focus direction.

A sled mechanism 53 permits the entire optical pickup 51 to move in the disc radial direction.

The laser diode is driven by a drive signal (drive current) fed from a laser driver 63 so as to provide laser emission.

The optical pickup 51 is also provided with a mechanism for correcting spherical aberration of laser light. Adjustment of the spherical aberration is carried out by control performed a system controller 60 and a servo circuit 61.

Information on light reflected from the disc 1 is detected by the photodetector and then converted into an electric signal based on the intensity of the detected light. The electric signal is supplied to a matrix circuit 54.

The matrix circuit 54 is provided with a current-voltage conversion circuit and a matrix calculation/amplification circuit for processing output currents from a plurality of light-receiving elements constituting the photodetector, so as to generate a signal necessary for matrix processing.

The matrix circuit 54 generates, for example, a high frequency signal (also referred to as a reproduction data signal or an RF signal) corresponding to reproduction data, a focus error signal, and a tracking error signal for servo control.

The matrix circuit 54 also generates a push-pull signal associated with wobbling of the groove track for detecting the wobbling.

The reproduction data signal output from the matrix circuit 54 is supplied to a reader/writer circuit 55. The focus error signal and the tracking error signal are supplied to the servo circuit 61, and the push-pull signal is supplied to a wobble circuit 58.

The reader/writer circuit 55 performs binarization processing on the reproduction signal and reproduction clock generation processing using a PLL. Then, the reader/writer 55 reproduced data read as dye-change pits and supplies the read data to a modulation/demodulation circuit 56.

The modulation/demodulation circuit 56 has a functional block serving as a decoder for reproduction and a functional block serving as an encoder for recording.

In reproduction, the modulation/demodulation circuit 56 performs decoding processing on a run-length limited code on the basis of a reproduction clock.

An ECC encoder/decoder 57 performs ECC encoding processing for adding an error correction code in recording and performs ECC decoding processing for carrying out error correction in reproduction.

During reproduction, the ECC encoder/decoder 57 stores data demodulated by the modulation/demodulation circuit 56 in an internal memory so as to perform error detection/correction processing, deinterleaving processing, etc., thereby obtaining reproduction data.

The reproduction data obtained through the decoding processing performed by the ECC encoder/decoder 57 is read on the basis of control performed by the system controller 60 and is transferred to an AV (Audio-Visual) system 120.

The push-pull signal associated with the wobbling of the groove is output from the matrix circuit 54 and then processed in the wobble circuit 58. The push-pull signal as ADIP information is demodulated into a data stream which forms an ADIP address, and the data stream is supplied to an address decoder 59.

The address decoder 59 performs decoding processing on the supplied data so as to obtain an address value. The address decoder 59 then supplies the address values to the system controller 60.

The address decoder 59 generates a clock through PLL processing using a wobble signal supplied from the wobble circuit 58, and provides the clock as an encode clock for recording to components of the disc drive apparatus.

In recording, recording data is provided from the AV system 120. The recording data is transferred to the internal memory of the ECC encoder/decoder 57 so as to be buffered.

At this time, the ECC encoder/decoder 57 performs encoding processing on the buffered recording data, such as addition of an error correction code, an interleaving code, a subcode, etc.

Such ECC-encoded data undergoes RLL(1-7)pp modulation in the modulation/demodulation circuit 56 and the modulated data is supplied to the reader/writer circuit 55.

The encode clock generated from the wobble signal, as described above, serves as a reference clock used for these encoding processing performed in recording.

The recording data generated through the encoding processing undergoes recording compensation processing in the reader/writer circuit 55, such as fine adjustment of the characteristics of recording layers, the shape of a laser spot of laser light, recording linear density, etc., and adjustment of a laser drive pulse waveform. Then, the recording data is transferred to the laser driver 63 as a laser drive pulse.

The laser driver 63 provides the laser drive pulse fed from the reader/writer circuit 55 to the laser diode in the optical pickup 51 so as to drive light emission of the laser diode. Thus, information pits (for example, dye-change pits) corresponding to the recording data are formed on the disc 1.

In addition, the laser drive 63 is provided with a so-called APC (Auto Power Control) circuit for controlling laser output to be constant regardless of temperature or the like. This laser output control is performed by monitoring the power of the laser output using output of a detector for laser power monitoring which is provided in the optical pickup 51.

Target values of laser output for recording and reproduction (recording laser power and reproduction laser power) are provided from the system controller 60. During recording/reproduction, the system controller 60 controls a laser output level to be the set target value.

The servo circuit 61 generates various servo drive signals for executing a servo operation, from the focus error signal and tracking error signal received from the matrix circuit 54. Such servo drive signals include a focus drive signal, a tracking drive signal, and a sled drive signal.

Specifically, the servo circuit 61 generates the focus drive signal and tracking drive signal in accordance with the focus error signal and the tracking error signal, so as to drive a focus coil and a tracking coil of the biaxial mechanism in the optical pickup 51. Thus, a focus servo loop and a tracking servo loop are constituted by the optical pickup 51, the matrix circuit 54, the servo circuit 61, and the biaxial mechanism.

Further, the servo circuit 61 turns off the tracking servo loop in response to a track-jump command sent from the system controller 60 and outputs a jump-drive signal so as to perform a track-jump operation.

The servo circuit 61 also generates a sled drive signal for driving the sled mechanism 53, on the basis of a sled error signal obtained as a low frequency component of the tracking error signal and on the basis of access execution control performed by the system controller 60. The sled mechanism 53 includes a main shaft that holds the optical pickup 51, a sled motor, a transmission gear, etc., although these parts are not shown. The sled mechanism 53 drives the sled motor in accordance with the sled drive signal such that intended slide movement of the optical pickup 51 is achieved.

A spindle servo circuit 62 performs control of CLV rotation of the spindle motor 52, for example.

The spindle servo circuit 62 obtains current information on an angular velocity of the spindle motor 52 from a received clock which is generated through the PLL processing for the wobble signal. The spindle servo circuit 62 then compares the obtained angular velocity information with predetermined reference CLV information, thereby generating a spindle error signal.

In data reproduction, a reproduction clock generated through a PLL in the reader/writer circuit 55 (a reference clock for decoding processing) serves as current angular velocity information of the spindle motor 52. Therefore, the spindle servo circuit 62 can also generate a spindle error signal by comparing this angular velocity information with the predetermined reference CLV information.

Further, the spindle servo circuit 62 outputs a spindle drive signal generated in accordance with the spindle error signal so as to activate the CLV rotation of the spindle motor 62.

The spindle servo circuit 62 also generates a spindle drive signal on the basis of a spindle kick/brake control signal from the system controller 60, so as to drive start, stop, acceleration, or deceleration of the spindle motor 52.

The various operations of the servo system and the recording/reproduction system described above are controlled by the system controller 60 which is constituted by a microcomputer.

The system controller 60 the various operations in accordance with a command provided by the AV system 120.

In response to a write command, for example, sent from the AV system 120, the system controller 60 first moves the optical pickup 51 to a position corresponding to an address to which data is to be written. Then, the system controller 60 causes the ECC encoder/decoder 57 and the modulation/demodulation circuit 56 to perform the encode processing described above on data transferred from the AV system 120. The data from the AV system 120 includes, for example, video data and audio data according to various standards such as the MPEG standard. Then, the reader/writer circuit 55 supplies a laser drive pulse to the laser driver 63 so that recording is carried out, as described above.

When a read command instructing transfer of data such as MPEG video data recorded on the disc 1 is provided from the AV system 120, the system controller performs control of a seek operation in which a target address is sought. Specifically, the system controller 60 instructs the servo circuit 61 to execute an access operation of the optical pickup 51 for accessing the data corresponding to the target address instructed by a seek command.

Then, the system controller 60 performs operation control necessary for transferring the data in the designated address to the AV system 120. Specifically, the system controller 60 controls the reader/writer circuit 55, the modulation/demodulation circuit 56, and the ECC encoder/decoder 57 to perform processing such as decoding/buffering on the data read form the disc 1. Then, the system controller 60 transfers the processed data to the AV system 120.

When such data recording and data reproduction as described above are performed, the system controller 60 controls access and recording/reproduction operations using an ADIP address detected by the wobble circuit 58 and the address decoder 59.

In the example illustrated in FIG. 15, the disc drive apparatus is connected to the AV system 120. The present invention is not limited to this example, and the disc drive apparatus may be connected to a personal computer, for example.

Further, the disc drive apparatus according to an embodiment of the present invention may not necessarily be connected to another apparatus. In this case, the disc drive apparatus has a different interface configuration for data input/output. For example, the disc drive apparatus is provided with an operation unit, display unit, or the like. That is, it is necessary that recording or reproduction can be performed in accordance with a user operation and terminal unit is provided for input/output of various data.

A variety of other configurations of the disc drive apparatus is applicable to the present invention. For example, the disc drive apparatus can be a recording-only apparatus or a reproduction-only apparatus.

Now, an adjustment mechanism for adjusting spherical aberration will be described.

The spherical aberration adjustment mechanism in the optical pickup 51 will be described with reference to FIGS. 16, 17A, and 17B. Each of FIGS. 16 to 17A illustrates the optical system of the optical pickup 51.

Figure 16:
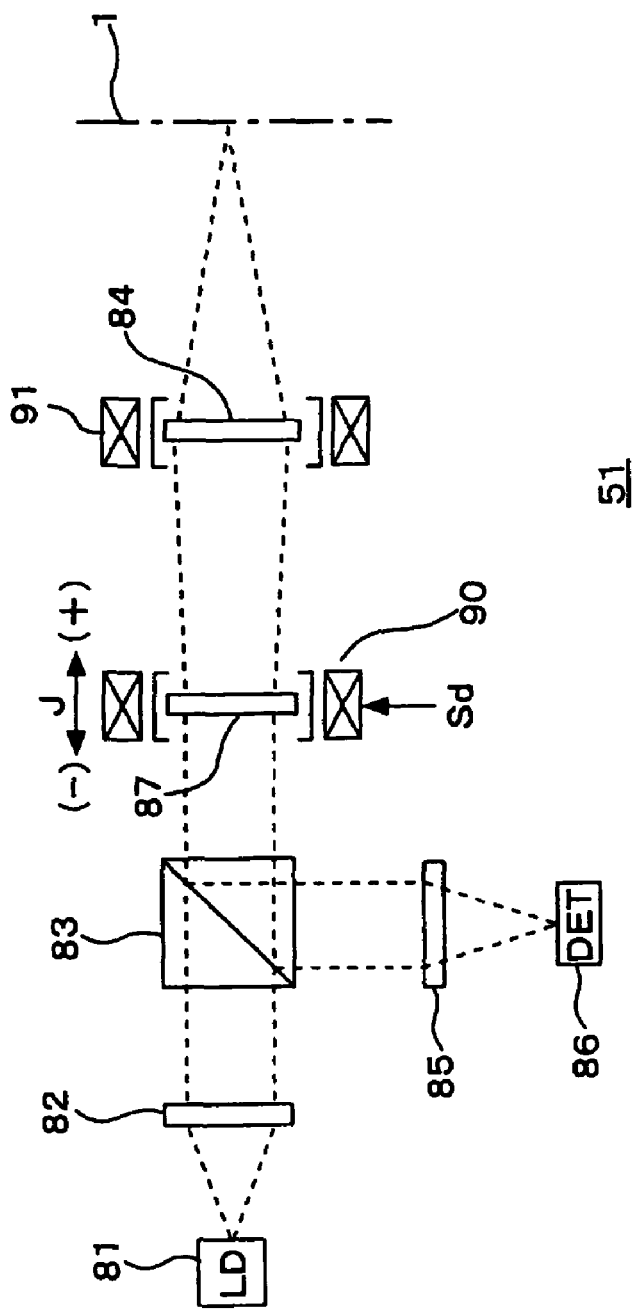
FIG. 16 illustrates a spherical aberration adjustment mechanism according to an embodiment of the present invention.
Figure 17:
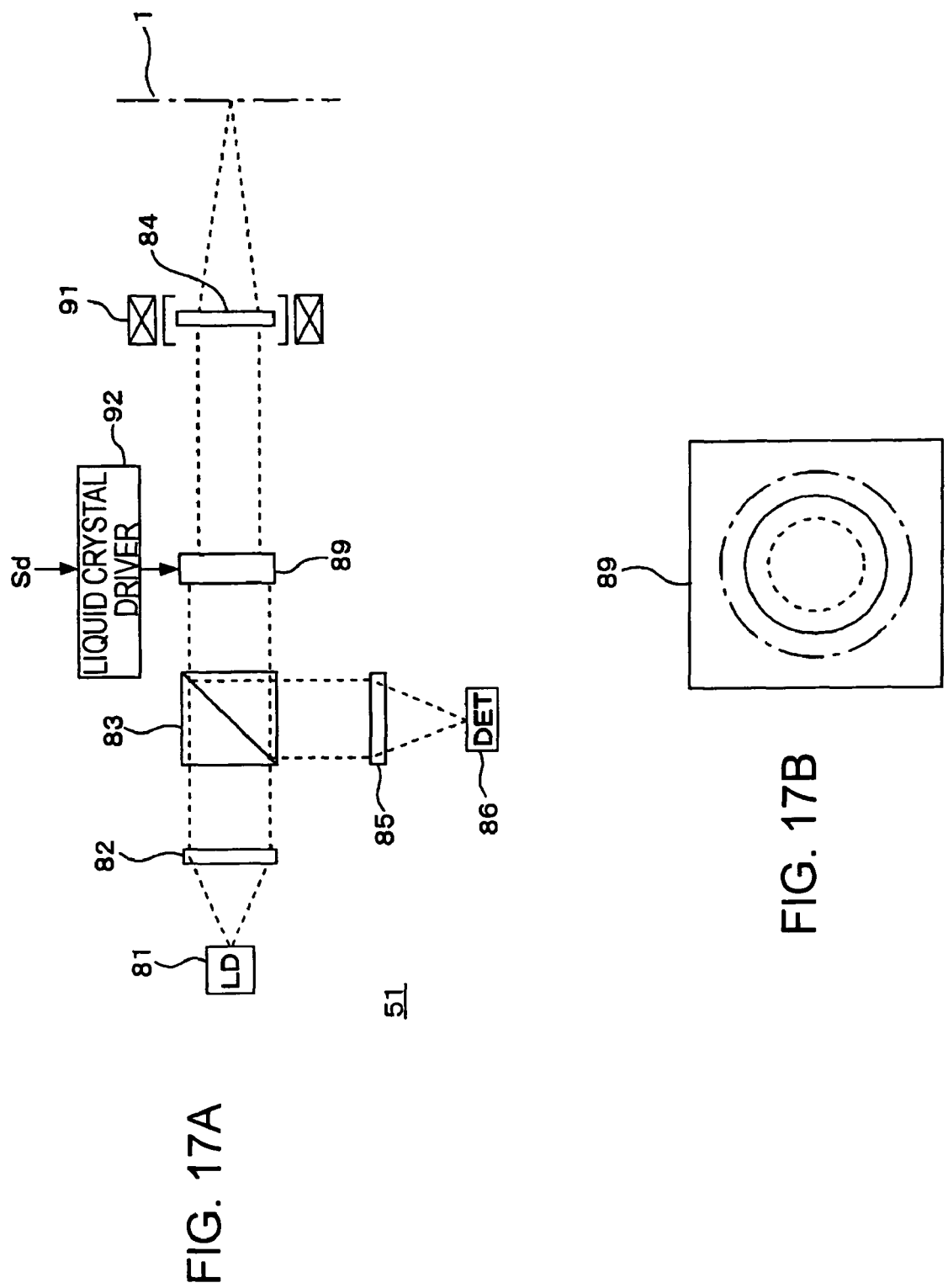
FIGS. 17A and 17B illustrate a spherical aberration adjustment mechanism according to an embodiment of the present invention.

In FIG. 16, laser light output from a semiconductor laser (laser diode) 81 is collimated by a collimating lens 82 and transmitted through a beam splitter 83. The laser light further travels through an expander lens 87 used for spherical aberration adjustment and an objective lens 84, and then irradiates the disc 1.

Reflected light from the disc 1 is transmitted through the objective lens 84 and the expander lens 87, reflected on a beam splitter 83, and incident on a detector 86 through a converging lens 85.

The objective lens 84 is supported by a biaxial mechanism 91 so as to be movable in the focus direction and the tracking direction. With this configuration, a focus servo operation and a tracking servo operation can be performed.

The expander lens 87 is capable of variably changing a diameter of laser light. Specifically, the expander lens 87 can be moved by an actuator 90 in the optical axis direction (direction J in FIG. 16). The movement of the expander lens 87 causes the distance between the expander lens 87 and the objective lens 84 to be changed, and thus the diameter of the laser light to be irradiated onto the disc 1 can be adjusted.

That is, adjustment of spherical aberration can be achieved by controlling the actuator 90 to move the expander lens 87 forward and backward (optical axis direction).

FIG. 17A illustrates an optical system similar to that illustrated in FIG. 16. However, the optical system in FIG. 17A uses a liquid crystal panel 89 instead of the expander lens 87.

Specifically, in the liquid crystal panel 89 a portion for passing through the laser light and a portion for shielding the laser light are set. A boundary of these portions is adjusted as illustrated by a solid line, a broken line, and a dotted-chain line in FIG. 17B, so that the diameter of the laser light can be changed.

In this case, adjustment of spherical aberration can be carried out by controlling a liquid crystal driver 92 for driving the liquid crystal panel 89 to change the passing-through portion.

Figure 18:
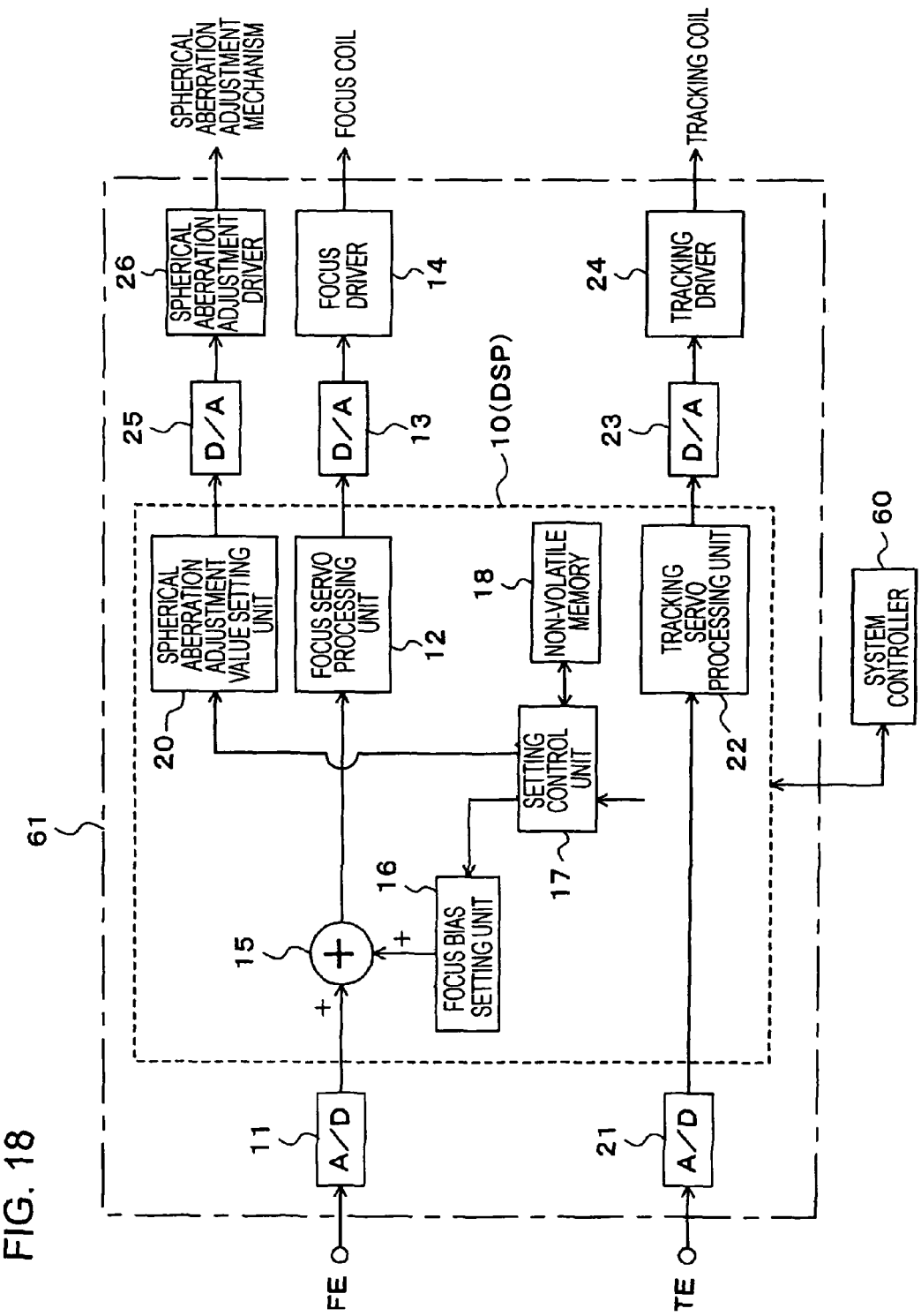
FIG. 18 is a block diagram illustrating a servo circuit of a disc drive apparatus according to an embodiment of the present invention.

FIG. 18 illustrates components of the servo circuit 61 shown in FIG. 15 that constitute the focus servo loop and tracking servo loop described above and components that are associated with setting of an adjustment value for spherical aberration.

A focus error signal FE and a tracking error signal TE are converted into digital data by analog/digital (A/D) converters 11 and 21, respectively, of the servo circuit 61, and then input to a DSP (Digital Signal Processor) 10.

The DSP 10 is provided with a focus servo processing unit 12 and a tracking servo processing unit 22.

The focus error signal FE output from the A/D converter 11 is input to the focus servo processing unit 12 through an adder 15.

The focus servo processing unit 12 performs predetermined processing on the focus error signal FE, such as filtering including phase compensation filtering and loop gain processing, so as to generate a focus servo signal. The focus servo signal is sent to a digital/analog (D/A) converter 13 so as to undergo D/A conversion (including PWM, PDM, etc.). The analog signal is then input to a focus driver 14 for driving a focus actuator. Specifically, an electric current is applied to a focus coil of the biaxial mechanism 91 that holds the objective lens 84 in the optical pickup 51 so that a focus servo operation is executed.

The tracking servo processing unit 22 performs predetermined processing on the tracking error signal TE input as digital data, such as filtering including phase compensation filtering and loop gain processing, so as to generate a tracking servo signal. The tracking servo signal is converted into an analog signal in a D/A converter 23 (including PWM, PDM, etc.) and then input to a tracking driver 24 for driving a tracking actuator. Specifically, an electric current is applied to a tracking coil of the biaxial mechanism 91 that holds the objective lens 84 in the optical pickup 51, so that a tracking servo operation is executed.

The DSP 10 includes functional components for setting a focus bias a spherical aberration adjustment value, and a functional component for controlling the setting of the focus bias and the spherical aberration.

The adder 15 adds a focus bias to the focus error signal FE. A focus bias value to be added is set in a focus bias setting unit 16. This focus bias value is set through adjustment processing described below and output by the focus bias setting unit 16. With this arrangement, an appropriate focus bias is applied to the focus servo loop.

A spherical aberration adjustment value setting unit 20 sets an adjustment value for spherical aberration to be applied in the spherical aberration adjustment mechanism. The set spherical aberration adjustment value is converted into an analog signal by a D/A converter 25 and supplied to a spherical aberration adjustment driver 26.

The spherical aberration adjustment driver 26, when applied in such a spherical aberration adjustment mechanism as illustrated in FIG. 16, serves as a circuit for supplying a drive signal Sd to the actuator 90 that moves the expander lens 87. The spherical aberration adjustment driver 26, when applied in such a spherical aberration adjustment mechanism as illustrated in FIG. 17, serves as a circuit for supplying a signal Sd to instruct the liquid crystal driver 92 to apply a voltage to intended cells of the liquid crystal panel 89.

Thus, the spherical aberration adjustment driver 26 drives the spherical aberration adjustment mechanism in the optical pickup 51, on the basis of the spherical aberration adjustment value provided by the spherical aberration adjustment value setting unit 20.

A non-volatile memory 18 stores initial values of a focus bias value and a spherical aberration adjustment value. The non-volatile memory 18 also stores an adjustment value obtained through focus bias/spherical aberration adjustment which will be described below, i.e., the optimum focus bias value and spherical aberration adjustment value.

A setting control unit 17 sets a setting value applied in the focus bias setting unit 16 and a setting value applied in the spherical aberration adjustment value setting unit 20. For example, the setting control unit 17 sets the value stored in the non-volatile memory 18 and also changes each set value in accordance with an instruction from the system controller 60.

As described above, operations associated with the focus servo calculation unit 12, the track servo calculation unit 22, and adjustment of focus bias/spherical aberration adjustment values are controlled by the system controller 60.

In the disc drive apparatus according to an embodiment of the present invention, a jitter value or an amplitude value of reproduction data (RF amplitude value) are used as evaluation values for optimizing the adjustment of the focus bias and spherical aberration.

Figure 19:
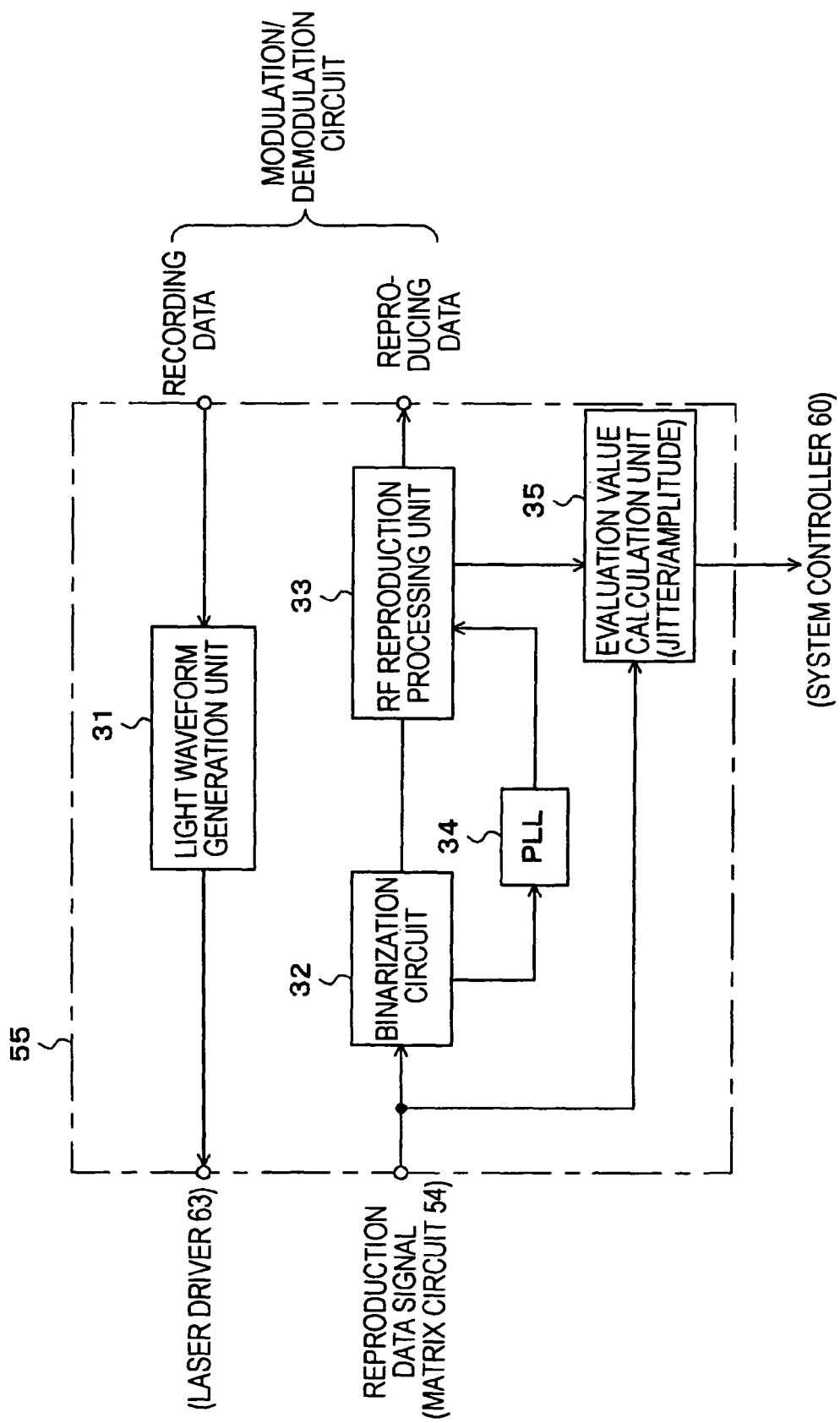
FIG. 19 is a block diagram illustrating a read/write circuit of a disc drive apparatus according to an embodiment of the present invention.

An example of a mechanism for obtaining these evaluation values is illustrated in FIG. 19.

An evaluation value can be obtained from a signal from the photodetector 86 in the optical pickup 51 which is based on reflected light, i.e., a signal generated through processing of the matrix circuit 54. Since the evaluation value is to be obtained from a reproduction data signal (RF signal) in this embodiment, the reader/writer circuit 55 can be configured as illustrated in FIG. 19, for example.

As shown in the figure, the reader/writer circuit 55 includes a light waveform generation unit 31, a binarization circuit 32, an RF reproduction processing unit 33, a PLL circuit 34, and an evaluation value calculation unit 35.

During recording, the light waveform generation unit 31 performs recording compensation processing for recording data which have been encoded by the modulation/demodulation circuit 56. The processing includes fine adjustment of an optimum recording power and adjustment of a laser drive pulse waveform, for recording layer characteristics, the size of a laser spot, a recording linear velocity, etc. Then the light pulse generation unit 31 sends a data signal which has undergone these processing to the laser driver 63 as the laser drive pulse.

In reproduction, the reproduction data signal (RF signal) from the matrix circuit 54 is binarized by the binarization circuit 32. The PLL circuit 34 generates a reproduction clock on the basis of the binary data.

The binary data is processed in an RF reproduction processing unit 33 in accordance with the reproduction clock and then sent to the modulation/demodulation circuit 56 as data read from dye-change pits, for example.

The evaluation value calculation unit 35 calculates a jitter value on the basis of the processing of the RF reproduction processing unit 33.

Alternatively, the evaluation value calculation unit 35 calculates an RF amplitude value by detecting the peak and bottom of the reproduction data signal (RF signal).

The evaluation value calculation unit 35 supplies the jitter value or the RF amplitude value obtained as the evaluation value to the system controller 60.

Adjustment of focus, i.e., a focus bias, is now described.

The system controller 60 turns on the focus servo so as to execute reproduction of the pre-write are of the disc 1. At this time, the system controller 60 instructs the setting control unit 17 in the servo circuit 61 to gradually change the focus bias value and also monitors jitter values obtained from the evaluation value calculation unit 35 which correspond to the respective focus bias values.

Figure 20:
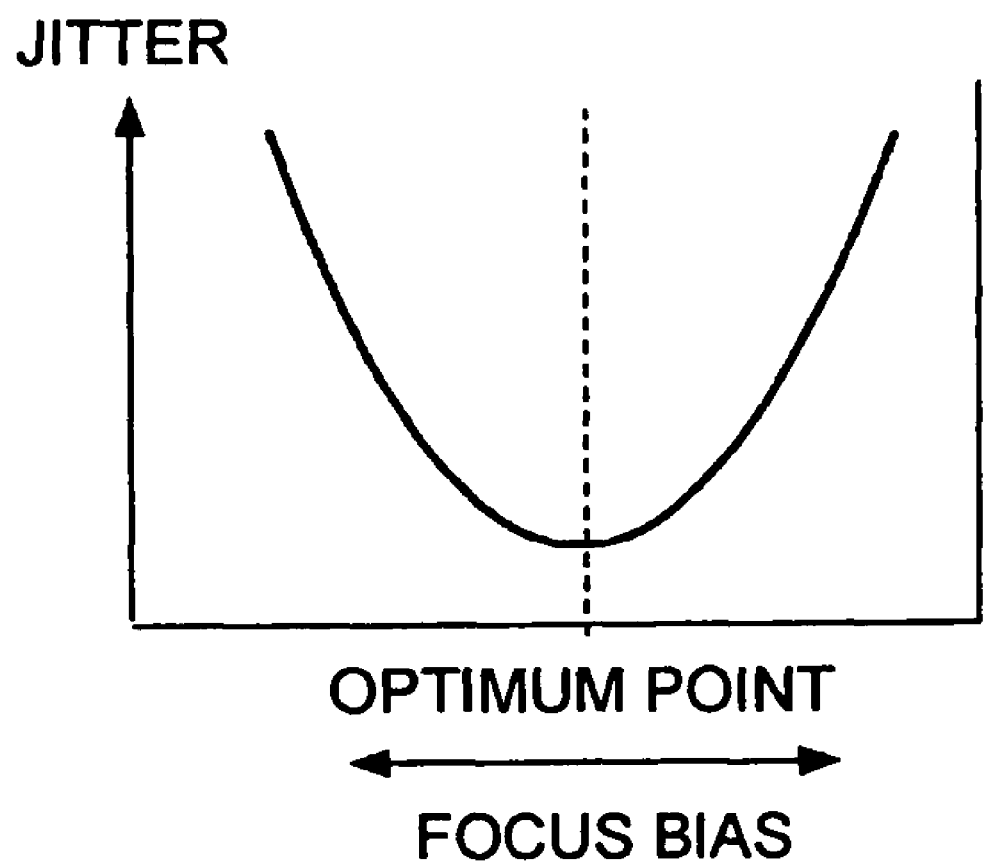
FIG. 20 illustrates focus bias adjustment according to an embodiment of the present invention.

The jitter value changes in accordance with the gradual change of the focus bias value in the manner as illustrated in FIG. 20. The point at which the jitter value is minimized indicates the optimum focus bias value. Specifically, the system controller 60, while monitoring the change of the jitter value by changing the focus bias value, changes the focus bias value to a value that brings about a decrease in the jitter value, thereby detecting the optimum focus bias value.

The focus bias value detected through the above operation which is performed while the pre-write area on a recording layer is reproduced is stored in the non-volatile memory 18 as a focus adjustment value for the recording layer.

In stead of the jitter value, a data error rate or an index value representing an error rate such as an SAM evaluation value (SAM jitter) obtained in PRML demodulation processing can be used.

In the following, spherical aberration adjustment is described.

The spherical aberration adjustment is performed as adjustment of a distance between the expander lens 87 and the objective lens 84 illustrated in FIG. 16. FIGS. 21A, 21B, and 21C schematically illustrate converging states of laser light onto the recording layers L0, L1, and L2, respectively.

When recording/reproduction is performed, laser light is converged onto the recording layer through the cover layer CLV of the disc 1. For example, in the case of the three-layer disc, the second recording layer L1, the third recording layer L2, and the middle layer therebetween are considered as cover layers of the first recording layer L0. Thus, it can be said that the cover layer CVL on the first recording layer L0 is thick, and thickness of the cover layer CVL decrease as the number of the recording layers increases.

This variation of the thickness of the cover layer CLV from which the laser light is incident brings about the necessity of adjustment of spherical aberration for each recording layer.

The distance between the expander lens 87 and the objective lens 84 is adjusted by moving the expander lens 87. This results in a change in the diameter of the laser light and thus a change in the amount of spherical aberration.

The effect of spherical aberration is reflected in the reproduction signal amplitude, as illustrated in FIG. 21D. Thus, the system controller 60 measures the reproduction signal amplitude provided by the evaluation value calculation unit 35 while changing the position of the expander lens 87. Then, the system controller determines the position of the expander lens 87 at which the reproduction signal amplitude is maximized.

When the spherical aberration adjustment mechanism illustrated in FIG. 17A is employed, an optimum drive signal applied to the liquid crystal panel 89 is obtained while the reproduction signal amplitude is monitored.

The spherical aberration adjustment value (for example, the setting value of the position of the expander lens 87), which has been detected through the operations performed during the reproduction of the pre-write area in the recording layer, is stored in the non-volatile memory 18 as the spherical aberration adjustment value for the recording layer.

As the evaluation value, a data error rate or a SAM evaluation value may be used instead of a reproduction signal amplitude.

[5. Processing Performed when Disc is Mounted]

Referring to FIGS. 22 to 25, an operation of the disc drive apparatus which is performed when the disc 1 is mounted there on will be described. FIGS. 22 to 25 are flowcharts illustrating a processing procedure performed by the system controller 60.

When detecting that the disc 1 has been mounted on the disc drive apparatus at STEP F101, the system controller 60 executes boot processing for the disc 1, at STEP F102. Specifically, the system controller 60 instructs the servo circuit 61, the spindle servo circuit 62, and the laser drive 63 to execute operations such as rotation of the spindle motor 52, stabilization of spindle rotation, laser emission, focus search, turn-on of focus servo, and turn-on of the tracking servo. These operations enable reading of information from the disc 1. Then the system controller 60 executes reading information recorded in the lead-in area.

At STEP F103, the system controller 60 checks information in a DMA in the information read from the lead-in area. As described above, replacement management information is recorded in the DMA when disc finalization processing is performed. Thus, the system controller 60 determines if effective replacement management information has been recorded in the DMA at STEP F104. If the result of the determination is positive, the system controller 60 determines that the mounted disc 1 has already been finalized, at STEP F105.

On the other hand, if, in STEP F104, it is determined that effective replacement management information has not been recorded in the DMA, the processing procedure proceeds to STEP F106. At STEP F106, the system controller 60 checks information in a TDMA in the information read from the lead-in area. Replacement management information is recorded for the first time in initialization processing. Thus, if it is determined that no information has been recorded in the TDMA at STEP F107, the system controller 60 determines that the mounted disc 1 has not been initialized, at STEP F108.

On the other hand, if, in STEP F107, it is determined that replacement management information has been recorded at least one time, the processing procedure proceeds to STEP F109. At STEP F109, the system controller 60 determines that the mounted disc 1 has been initialized but not been finalized.

Figure 23:
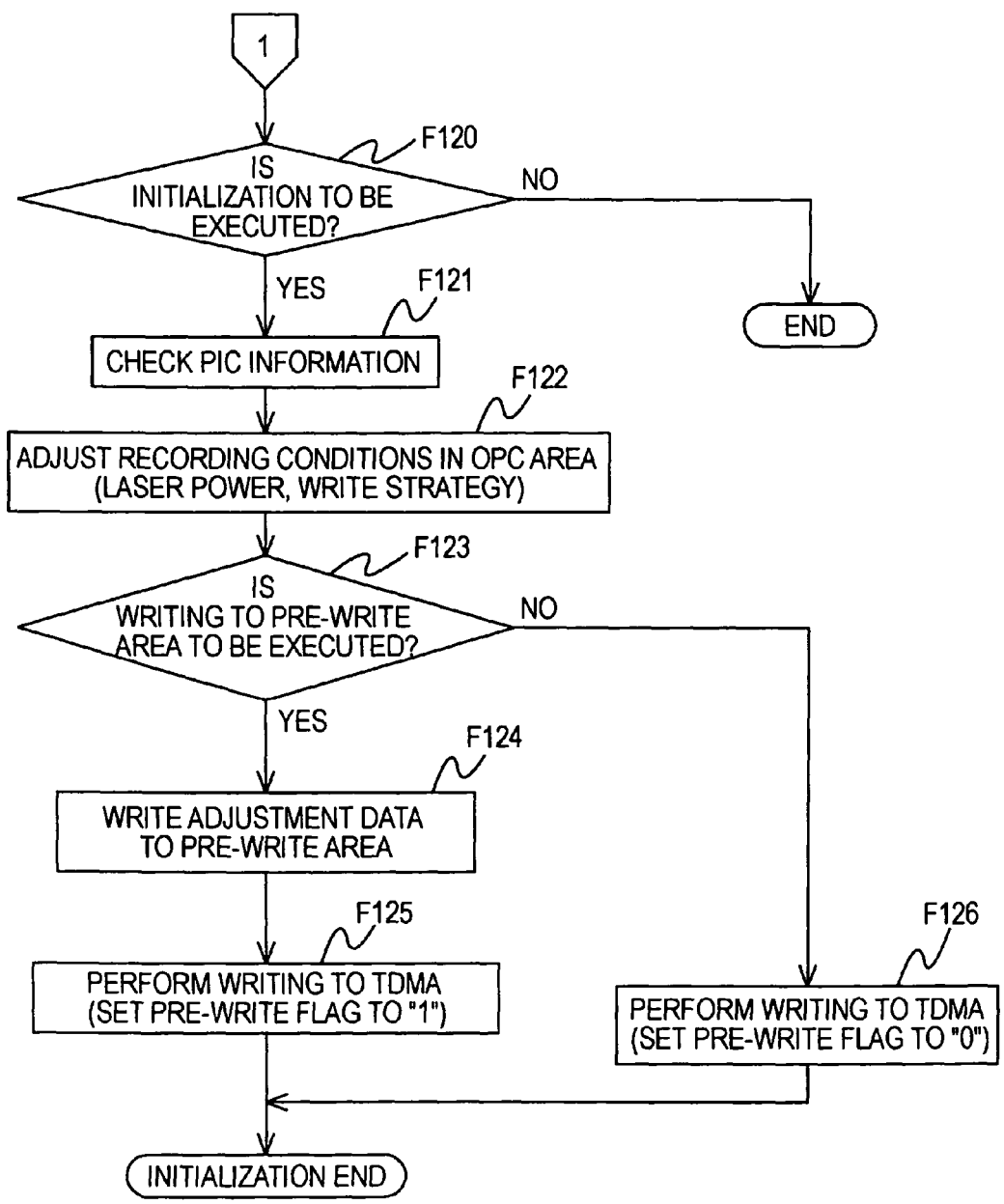
FIG. 23 is a flowchart illustrating a processing procedure according to an embodiment of the present invention, which is performed when a disc is mounted.

If, in STEP F108, it is determined that the disc 1, which has not been initialized (non-initialized disc), is mounted, the system controller 60 determines whether or not initialization is performed, at STEP F120 shown in FIG. 23. Whether or not initialization is performed when a non-initialized disc is mounted can be determined in advance as an operation configuration of the disc drive apparatus, or can be selected through mode setting or the like. It can also be configured such that a user is requested to determine whether or not to carry out initialization in the processing of STEP F120.

If it is determined that initialization is not to be performed, the processing for the mounted disc 1 is terminated.

If it is determined that initialization is to be performed, the system controller 60 checks PIC information in the pre-recorded area PR in the lead-in area which has already been read, at STEP F121. In this processing, the system controller 60 checks suggested values for recording conditions such as a recording laser power, etc.

Then, at STEP F122, the system controller 60 executes adjustment of the recording conditions such as a recording laser power and a write strategy (laser pulse waveform), using the test write area OPC on the basis of the suggested values. The system controller 60 executes writing of predetermined data in the test write area OPC. At the same time, the system controller 60 detects the optimum recording laser power and laser drive pulse waveform while monitoring, for example, evaluation values provided from the evaluation value calculation unit 35. Thus, the recording conditions are adjusted to be optimum.

Subsequently, at STEP F123, the system controller 60 determines whether or not writing to the pre-write area is executed. This can be determined in advance in initialization processing or can be selected as an initialization scheme. This can also be determined by requesting the user to select whether or not to perform the reading to the pre-write area.

If, in STEP F123, it is determined that reading of the pre-write area is not to be executed, the processing procedure proceeds to STEP F126. At STEP F126, the system controller 60 records initial replacement management information in the TDMA and then terminates the initialization processing. The DDS information to be recorded in the TDMA includes the pre-write flag (see, FIG. 11). For the above case, since writing to the pre-write area is not to be performed, the bit value of the pre-write flag is set to "0".

When writing to the pre-write area is to be executed, the system controller 60 executes writing of adjustment data of focus or spherical aberration to the pre-write area. For example, the system controller 60 generates data having a value of "00h", for example, as adjustment data and executes recording operations using reader/writer 55, the servo circuit 61, the spindle servo circuit 62, and the optical pickup 51 so as to write the adjustment data to the pre-write area.

At this time, when the disc 1 is an N-layer disc, the adjustment data can be written to the pre-write areas of all recording layers. It is also possible that the adjustment data is written to only the pre-write area of the first recording layer L0 or the pre-write areas of some of the recording layers.

When the writing of the pre-write area is completed, the system controller 60 records the initial replacement management information in the TDMA, at STEP F125, and terminates the initialization processing. In this case, the bit value of the pre-write flag included in the DDS information recorded in the TDMA which corresponds to each of the recording layer having the adjustment data recorded therein is set "1".

Figure 22:
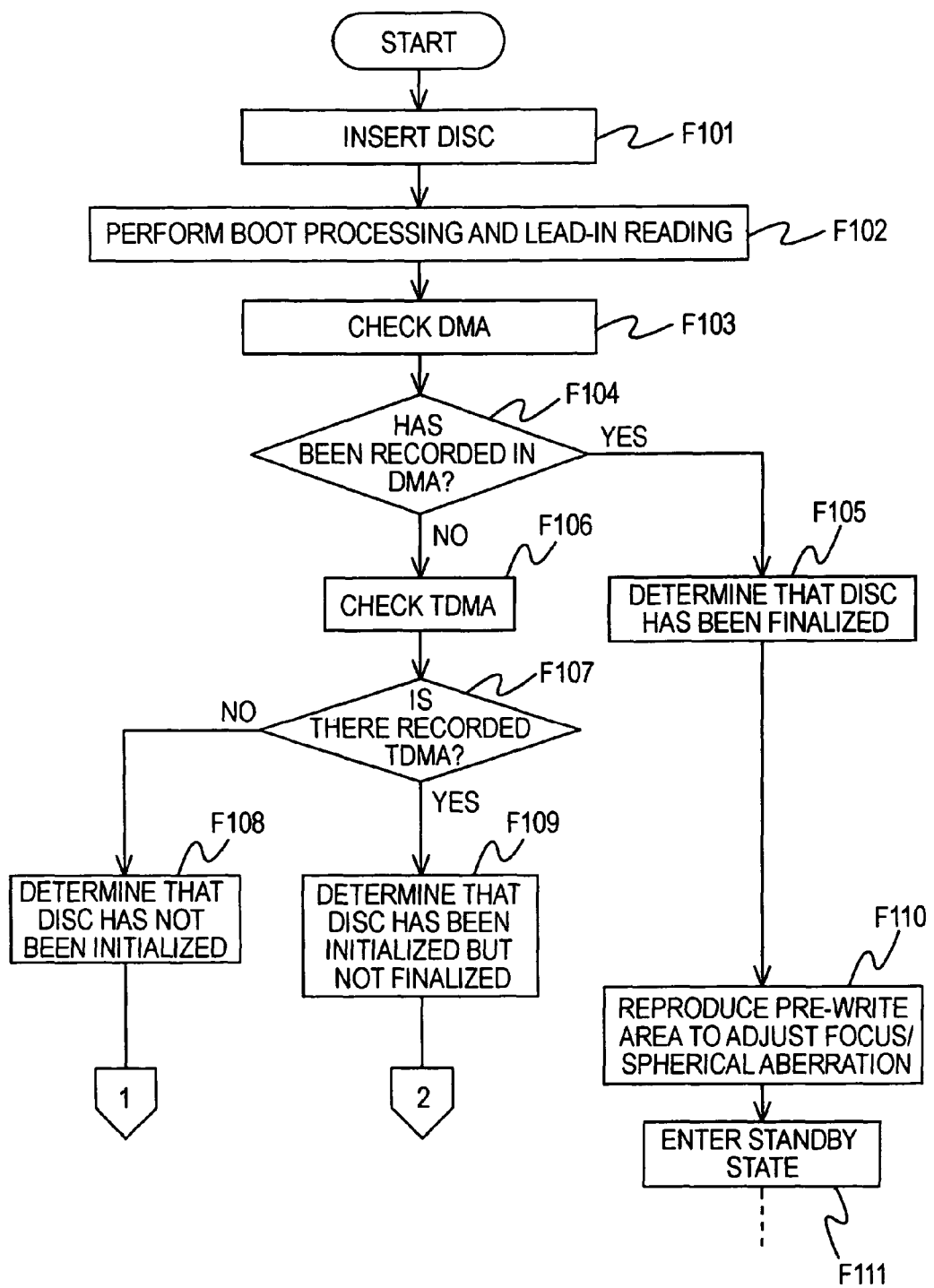
FIG. 22 is a flowchart illustrating a processing procedure according to an embodiment of the present invention, which is performed when a disc is mounted.
Figure 24:
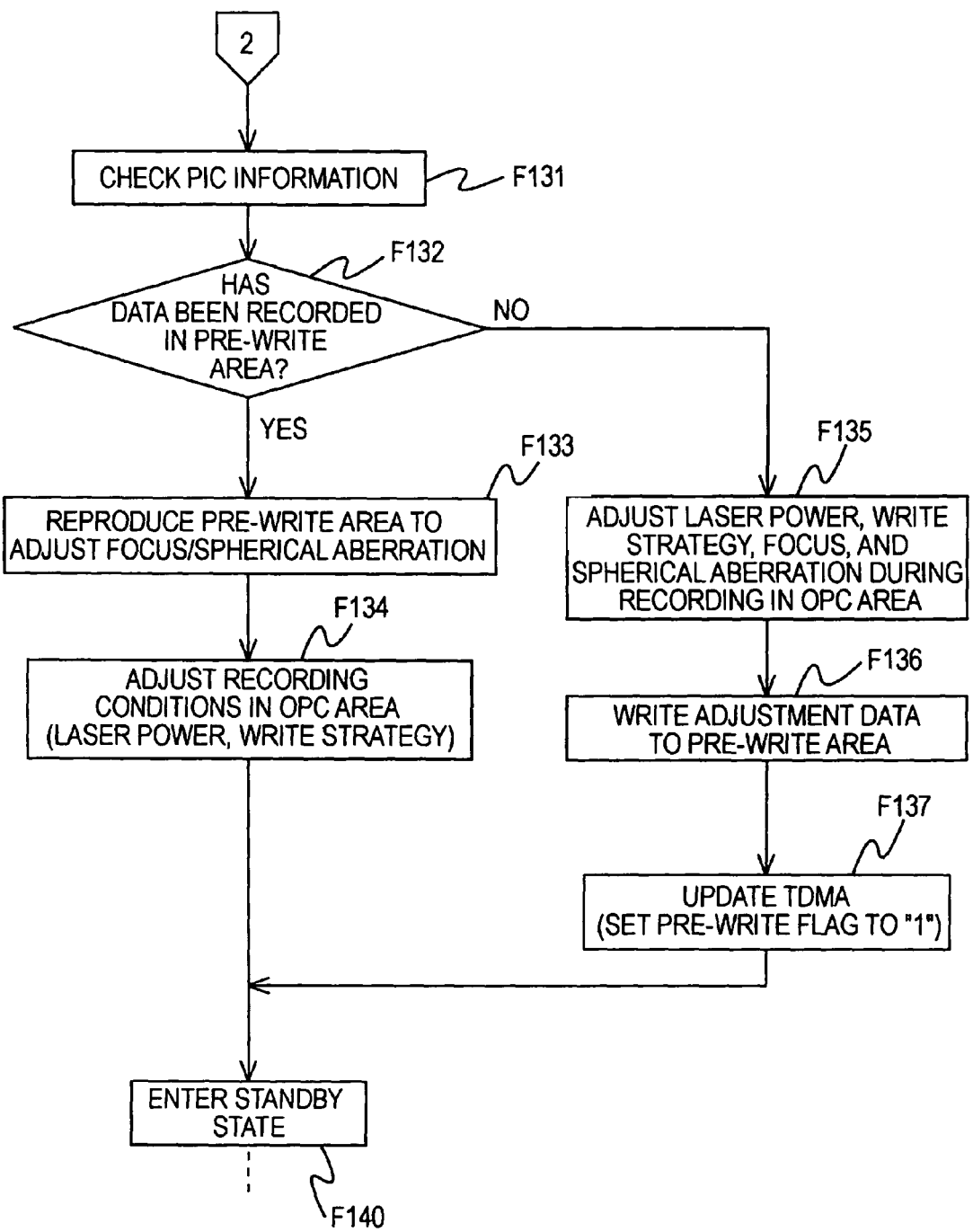
FIG. 24 is a flowchart illustrating a processing procedure according to an embodiment of the present invention, which is performed when a disc is mounted.
Figure 25:
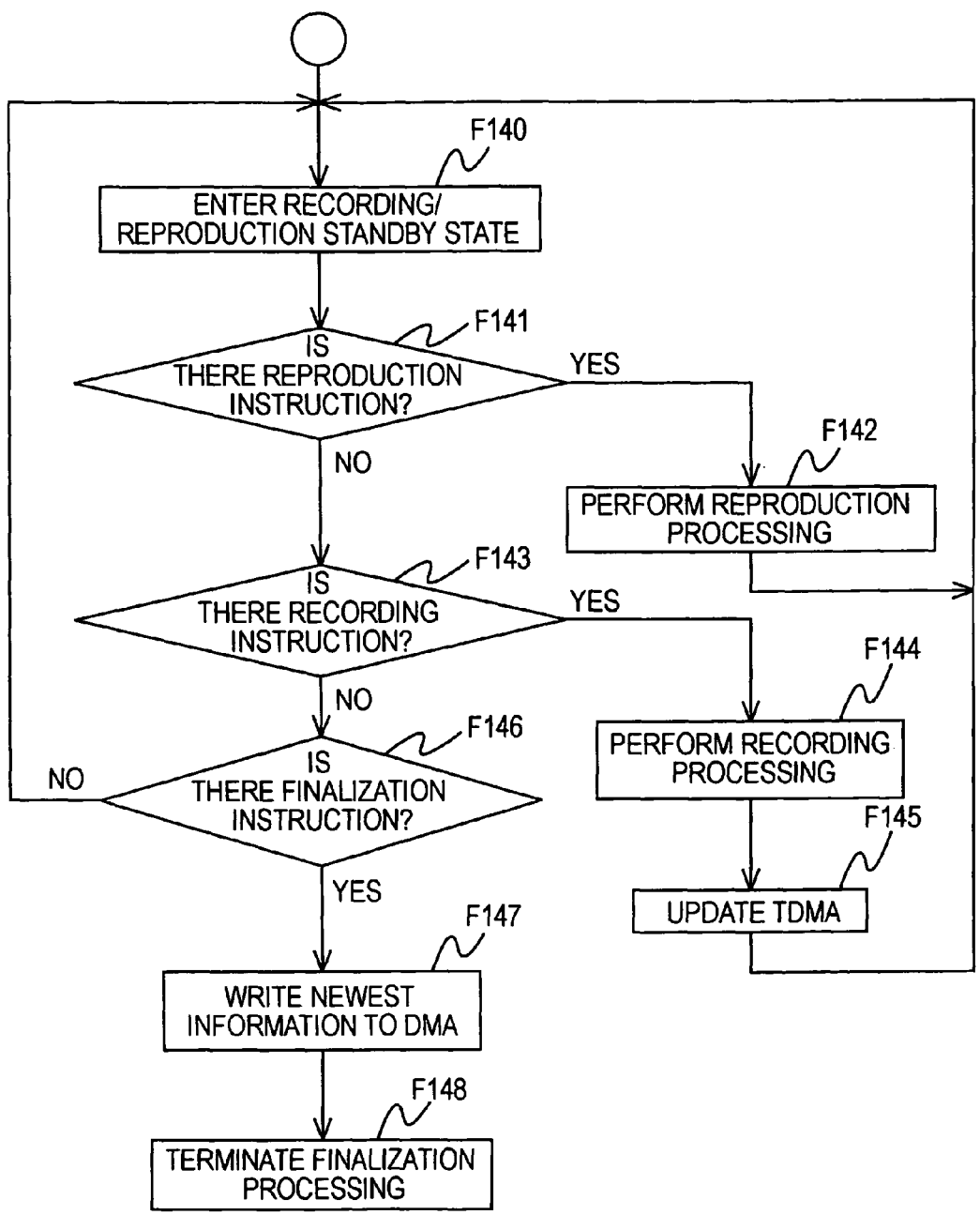
FIG. 25 is a flowchart illustrating a processing procedure according to an embodiment of the present invention, which is performed when a disc is mounted.

If, in STEP F109 in FIG. 22, the mounted disc 1 is determined to have been initialized, the processing procedure proceeds to STEP F131 in FIG. 24.

Also in this case, the system controller 60 checks the PIC information in the pre-recorded information area PR of the lead-in area, which has already read, so as to check suggested values of recording conditions such as a recording laser power, at STEP F131.

Then, at STEP F132, the system controller 60 determines whether or not adjustment data has been recorded in the pre-write area. In this processing, the bit value of the pre-write flag included in the newest DDS information in the TDMA.

In this step, it can be determined from the value of the pre-write area that the adjustment data has been recorded in the pre-write area, in the case described above where the adjustment data is recorded in the pre-write area when initialization is performed. In this case, the system controller 60 executes adjustment of the focus or spherical aberration, at STEP F133. Specifically, the system controller 60 detects the optimum focus bias value by gradually changing the focus bias value while monitoring a corresponding jitter value provided from the evaluation value calculation unit 35. In addition, the system controller 60 detects the optimum spherical aberration adjustment value by gradually changing the spherical aberration adjustment value while monitoring a corresponding reproduction signal amplitude provided by the evaluation value calculation unit 35.

In the above processing, it is also possible that the focus bias value and the spherical aberration adjustment value are adjusted for only a specific recording layer (e.g., the first recording layer L0) by reproducing the adjustment data in the pre-write area of the specific recording layer. In addition, the focus bias value and the spherical aberration adjustment can sequentially be adjusted for a plurality of recording layers.

When the adjustment of the focus bias value and spherical aberration adjustment value is performed for only a specific recording layer, the adjustment is performed for the recording layer with which recording/reproduction is intended to be subsequently performed. In this case, the focus bias value and spherical aberration adjustment value are set to be optimum in the pre-write area of the intended recording layer.

When the adjustment of the focus bias value and spherical aberration adjustment value is performed for all recording layers, first, these values are adjusted while the pre-write area of the first recording layer L0, for example, is reproduced, and the adjusted values are stored in the non-volatile memory 18 as the optimum values for the first recording layer L0. Second, these values are adjusted while the pre-write area of the second recording layer L1 is reproduced, and the adjusted values are stored in the non-volatile memory 18 as the optimum values for the second recording layer L1. Likewise, the adjustment processing is sequentially performed and the resultant optimum values are sequentially stored in the non-volatile memory 18. When the adjustment of these values are completed for every recording layer, the system controller 60 sets the optimum values that correspond to the recording layer with which recording/reproduction is intended to be subsequently performed.

Subsequently, at STEP F134, the system controller 60 executes adjustment of recording conditions using the test write area OPC, on the basis of the suggested values of the recording conditions, which have already read from the PIC information. For example, adjustment of a recording laser power and write strategy is performed at this time. Specifically, the system controller 60 executes writing of predetermined data to the test write area OPC, and also detects the optimum recording laser power and laser drive pulse waveform while monitoring evaluation values or the like provided from the evaluation value calculation unit 35, for example. Thus, the system controller 60 adjusts these recording conditions to be optimum.

When the adjustment of the recording conditions is completed, the system controller 60 enters a standby state, at STEP F140.

In STEP F132 described above, it is determined that no data has been recorded in the pre-write area, in such a case where writing to the pre-write area was not recorded in initialization processing, where the user has selected an operation scheme for the disc drive apparatus, in which the writing to the pre-write area is not to be performed in the initialization processing, or where the disc 1 has been initialized by another disc drive apparatus configured not to perform writing to the pre-write area.

When it is determined that no data has been recorded in the pre-write area in STEP F132, the system controller 60 executes adjustment of recording conditions using the test write area OPC, on the basis of the suggested values of the recording conditions, which have already read from the PIC information.

At the same time adjustment of focus or spherical aberration is also performed. That is, the adjustment of focus or spherical aberration is performed using the test-write area OPC.

When these adjustment operations are completed, the system controller 60 writes adjustment data to the pre-write area, at STEP F136. Also in this case, the writing to the pre-write area can be performed for all of the recording layers or for one or some of the recording layers.

When the writing to the pre-write area is completed, the system controller 60 records new DDS information to the TDMA, at STEP F137. The value of pre-write flag corresponding to the recording layer for which the writing to the pre-write area has been performed is set to "1".

Then, at STEP F140, the system controller 60 enters a standby state.

After the system controller 60 enters the standby state, recording/reproduction is performed in accordance with a command from the AV system 120.

When receiving a reproduction instruction while in the standby state for recording/reproduction, at STEP F141, the system controller 60 executes the reproduction operation described above in accordance with the reproduction instruction and sends reproduction data to the AV system 120, at STEP F142.

When receiving a recording instruction, at STEP F143, the system controller 60 executes the recording operation described above in accordance with the recording instruction so as to record data transferred from the AV system 120 on the disc 1, at STEP F144. In conjunction with the recording operation, update of information such as the DDS information is necessary. Thus, the system controller 60 records new DDS information in the TDMA, at STEP F145.

In a case where a transition from one recording layer to a subsequent recording layer occurs during the recording or reproduction operation, the focus bias value and spherical aberration adjustment value are switched to those for the subsequent recording layer. For example, the adjustment in the processing of STEP F133 in FIG. 24 has been performed for all recording layers, the focus bias value and spherical aberration adjustment value are switched to those for the subsequent recording layers which are stored in the nonvolatile memory 18 as the optimum values, at the time when the transition occurs.

In the case where adjustment of the focus bias value and spherical aberration adjustment value has not been performed for all recording layers in the processing of STEP F133, these values for the subsequent recording layer are adjusted using the pre-write area of the subsequent recording layer, at the time when the transition occurs.

As described using FIG. 24, in the case where no data has been recorded in the pre-write area, writing of pre-write area is performed at STEP F136. However, it is also possible, for example, that presence or absence of written data in the pre-write area is determined when the recording instruction is provided in STEP F143. Then, if it is determined that no data is present in the pre-write area, writing to pre-write area can be preformed at this time.

When receiving an instruction for finalizing the disc 1 from the AV system at STEP F146, the system controller 60 performs finalization processing, at STEP F147. Specifically, the system controller 60 writes the newest DMA information currently stored in the TDMA to the DMAs. Thus, the finalization processing is terminated, at STEP F148, and thereafter the disc 1 is used only for reproduction as a finalized disc.

Such a finalized disc is mounted on the disc drive apparatus, the disc is determined to be a finalized disc in the processing of STEP F105 in FIG. 22.

In this case, the system controller 60 executes adjustment of the focus bias value and spherical aberration adjustment value using the pre-write area, at STEP F110, and then enters to a reproduction standby state, at STEP F110. Thereafter, the reproduction operation is performed in accordance with a reproduction instruction.

As described above, in this embodiment, each recording layer of the disc 1 has a pre-write area which serves as an adjustment recording area used for adjusting focus and spherical aberration. The disc drive apparatus performs writing of adjustment data to the pre-write area in STEP F124 when initialization is performed. Alternatively, if it is determined that the mounted disc 1 which has already been initialized and that no data has been written to the pre-write area, writing of adjustment data to the pre-write area is performed before the disc drive apparatus enters a recording/reproduction standby state (STEP F136) or when the recording operation of STEP F144 is performed. Further, in response to the writing to the pre-write area, the disc drive apparatus updates the pre-write flag which serves as determination information indicating presence or absence of adjustment data in the pre-write area (STEP F125, STEP F137).

By checking the pre-write flag during recording or reproduction, the disc drive apparatus can immediately recognize whether or not the adjustment data has been recorded in the pre-write area in each recording layer. That is, it is not necessary for the disc drive apparatus to actually reproduce the pre-write area to determine presence or absence of adjustment data.

Then, if it is determined that the adjustment data has been recorded in the pre-write area, the disc drive apparatus can immediately perform adjustment of focus or spherical aberration by reproducing the pre-write area. Particularly, the adjustment of focus or spherical aberration can be performed using the pre-write area, which is dedicated for focus and spherical aberration adjustment, independently of the adjustment of recording conditions such as a laser power. This reduces the time for completing the various adjustment operations.

Thus, adjustment of focus and spherical aberration can be performed in a short time during recording/reproduction, which reduces the time elapsed from disc mounting to recording/reproduction standby (STEP 140).

Also in the case of the N-layer disc, since the pre-write area is provided on each recording layer, adjustment of focus and spherical aberration can be performed appropriately for each recording layer.

On the other hand, there is the case as described above where no adjustment data has been written to the pre-write area, and thus adjustment of focus and spherical aberration is performed in conjunction with adjustment of recording conditions using the test write area OPC (STEP F135). In this case, a significantly long time is necessary since processing for completing these adjustment operations is very complicated and the adjustment values used for the operations affect each other.

However, according to an aspect of the present invention, when the disc 1, whose pre-write area has no data recorded therein, is mounted, adjustment data is written to the pre-write area (STEP F136). Therefore, when the disc 1 is mounted next time and thereafter, the adjustment operations can be performed in a decreased time.

The position of the pre-write area in the disc 1 is not limited to the one described in the above example. The pre-write area can be provided in a lead-out zone or an outer zone positioned at the outer circumference side. The pre-write area can also be provided in both the inner circumference side (lead-in zone or an inner zone) and the outer circumference side (lead-out zone or an outer zone).

In view of the recording direction, it can be configured such that the pre-write area of each odd-numbered layer (the first recording layer L0, the third recording layer L2, etc.) is provided in the outer circumference side, and the pre-write area for each even-numbered layer (the second recording layer L1, the fourth recording layer L3, etc.) is provided in the outer circumference side.

Regarding the recording position of the pre-write flag as determination information, various arrangements other than the above example can be applied.

Moreover, in the above description, the disc 1 is assumed to be a write-once disc. However, the disc drive apparatus according to the above described embodiment can be implemented as being compatible with a rewritable disc such as a phase-change recording disc and a magneto-optical recording disc.

The present invention is applicable to various optical recording media other than discs.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium including a plurality of recording layers, the optical recording medium comprising:
   an adjustment data recording area for recording therein adjustment data used for adjusting focus or spherical aberration of laser light used for recording/reproduction, the adjustment data recording area being disposed at a predetermined position on each of the plurality of recording layers; and
   a disc management area or temporary disc management area to record at least replacement management information, the disc management area including a disc definition structure including a single one-byte pre-write area flag indicating for all of the plurality of recording layers of the optical recording medium whether or not the adjustment data for each respective layer has been recorded in the adjustment data recording area,
   wherein the single one-byte pre-write area flag comprises only one bit for each respective recording layer so that a value of the only one bit indicates whether or not the adjustment data has been recorded for the respective recording layer.

2. The optical recording medium of claim 1, wherein the optical recording medium is a write-once recording medium on which data can only be written one time.

3. The optical recording medium of claim 1, wherein the disc definition structure further includes a spare area full flag indicating whether all of an inner spare area and an outer spare area has been used for data writing.

* * * * *